(12) United States Patent
Okada

(10) Patent No.: US 7,191,594 B2
(45) Date of Patent: Mar. 20, 2007

(54) HYDROSTATIC STEPLESS TRANSMISSION

(76) Inventor: Hideaki Okada, 2-18-1, Inadera, Amagasaki-shi, Hyogo, 661-0981 (JP)

( * ) Notice: Subject to any disclaimer, the term of this patent is extended or adjusted under 35 U.S.C. 154(b) by 0 days.

(21) Appl. No.: 11/283,796

(22) Filed: Nov. 22, 2005

(65) Prior Publication Data

US 2006/0070376 A1 Apr. 6, 2006

Related U.S. Application Data

(63) Continuation of application No. 10/767,844, filed on Jan. 30, 2004, now Pat. No. 6,988,362.

(30) Foreign Application Priority Data

Jan. 30, 2003 (JP) ............................... 2003-21669

(51) Int. Cl.
*F16D 31/02* (2006.01)
(52) U.S. Cl. ........................ 60/433; 60/465; 60/468; 60/494
(58) Field of Classification Search ............... 60/488, 60/489, 465, 464, 433, 494, 468
See application file for complete search history.

(56) References Cited

U.S. PATENT DOCUMENTS

| | | | |
|---|---|---|---|
| 5,235,810 A | | 8/1993 | Havens |
| 5,356,347 A | * | 10/1994 | Komura et al. ............... 474/28 |
| 5,546,752 A | * | 8/1996 | Horton et al. ................ 60/464 |
| 5,836,159 A | | 11/1998 | Shimizu et al. |
| 5,855,116 A | * | 1/1999 | Horton et al. ................ 60/464 |
| 6,109,032 A | | 8/2000 | Shimizu et al. |
| 6,513,325 B2 | | 2/2003 | Shimizu et al. |

(Continued)

FOREIGN PATENT DOCUMENTS

| | | |
|---|---|---|
| JP | 61-32653 | 2/1986 |
| JP | 03-69755 | 7/1991 |
| JP | 59-216733 | 12/1994 |

OTHER PUBLICATIONS

Translation of Abstract for JP-59-216733.

*Primary Examiner*—Igor Kershteyn
(74) *Attorney, Agent, or Firm*—Sterne, Kessler, Goldstein & Fox P.L.L.C.

(57) ABSTRACT

A hydrostatic stepless transmission comprises a hydraulic pump and a hydraulic motor, at least one of the hydraulic pump and motor being variable in displacement; a closed circuit for fluidly connecting the hydraulic pump and motor to each other therethrough, the closed circuit including a pair of oil passages between the hydraulic pump and motor, one of the oil passages being hydraulically higher-pressured and the other being hydraulically depressed when the hydraulic pump delivers oil to the hydraulic motor; a speed change operation device for changing output rotational speed of the hydraulic motor; and a leak valve connected to the speed change operation device. The leak valve is connected to the closed circuit so that, when the speed change operation device is suddenly operated, the leak valve allows oil to leak from the higher-pressured oil passage to an area hydraulically pressured lower than the higher-pressured oil passage, such as the depressed oil passage in the closed circuit or an oil sump out of the closed circuit, and then stops leaking oil when operation of the speed change operation device is stopped.

5 Claims, 16 Drawing Sheets

U.S. PATENT DOCUMENTS 6,681,570 B2 * 1/2004 Takada et al. ............... 60/468
6,837,047 B2   1/2005 Dong et al.
6,904,748 B2   6/2005 Takada et al.

* cited by examiner (a)

(b)

HYDROSTATIC STEPLESS TRANSMISSION

BACKGROUND OF THE INVENTION

1. Field of the Invention

The present invention relates to a hydrostatic stepless transmission (HST). More particularly, it relates to a mechanism for easing rising of hydraulic pressure at the time of sudden speed change operation of the HST.

2. Related Art

It is well known that a conventional vehicle having an HST operated by a speed change operation member, such as a lever or pedal, is provided with a mechanism for softening output change of the HST as to prevent shock or jerky movement, that is, lifting of either the front or rear portion of the vehicle when the speed change operation member is suddenly operated to start or stop the vehicle.

For example, in a conventional vehicle as disclosed in the Japanese Utility Model Laid Open Gazette Sho. 61-32653, a shock absorber filled with fluid or gas is disposed outside a transmission housing incorporating an HST and is connected to a linkage between a speed change manipulator (lever) and an operation arm for changing output of the HST, so as to soften movement of the operation arm even when suddenly operating the speed change lever. The connection between the hydraulic cylinder and the linkage is complicated. The external hydraulic cylinder must prevent fluid or gas from leaking and guard against water, dust, corrosion and the like, thereby making it expensive.

Furthermore, since rotation of the operation arm is slowed, acceleration of the vehicle may be unexpectedly slowed. More specifically, even if the shock absorber is set to apply operational weight onto the speed change lever such as being suitable for some people, other people may feel it is difficult to operate the speed change lever to get appropriate acceleration, and other people may apply a heavier operational force onto the speed change lever against the resistant force of the shock absorber, thereby unexpectedly suddenly changing output speed of the HST and causing shock. Thus, it is hard to appropriately set resistance of the shock absorber for operational force.

A conventional transaxle as disclosed in the Japanese Utility Model Laid Open Gazette Hei. 3-69755 has a housing incorporating an HST and filled therein with oil. A hydraulic cylinder is disposed in the housing and supplied with oil from the oil sump in the housing. The hydraulic cylinder is connected to a linkage for moving a movable swash plate of the HST. However, the hydraulic cylinder serves as a shock absorber for softening movement of the swash plate, thereby including the same problem as mentioned above.

A conventional transaxle as disclosed in the Japanese Patent Laid Open Gazette Sho. 59-216733 has a switching valve which can be opened and closed by operating a speed change operation means for changing output rotational speed or direction of an HST. The switching valve is provided for expanding a neutral zone of the HST so that, when the speed change operation means is moved adjacent to its neutral position, the switching valve is opened to bypass between the higher-pressure area and the depressed area in the HST closed circuit. The switching valve is disposed outside a housing incorporating the HST, thereby having the above-mentioned problem in its protection.

A conventional transaxle as disclosed in U.S. Pat. Nos. 5,836,159 and 6,109,032 has a housing forming an oil sump therein, in which an HST comprising a variable displacement hydraulic pump, a hydraulic motor, and a center section with a closed circuit formed therein for fluidly connecting the hydraulic pump to the hydraulic motor are housed. In the housing, a rotary member as a part of a linkage from a speed changing operation device is connected to a movable swash plate of the hydraulic pump. A valve member, fluidly connected to the closed circuit, is fitted in the center section, and projects outward from the center section. The rotary member is extended to form a plate-like portion in contact with the outer end of the valve member. The plate-like portion is formed with a groove. When an opening of the valve member communicates with the groove, oil is drained from the closed circuit to the oil sump in the housing so as to expand the neutral zone of HST, thereby easing shock when the vehicle starts or stops. Thus, the opening-and-closing of the valve member depends on rotation of the plate-like portion of the rotary member in contact with the opening end of valve member, thereby requiring a considerably large space for rotation of the plate-like portion in the housing.

Especially, each of the switching valve of the Japanese Document No. '733 and the mechanism of the U.S. Document Nos. '159 and '032 expands the neutral zone of HST so as to ease shock in case of starting or almost stopping a vehicle. However, oil leakage from the HST closed circuit is prevented when the HST is set out of the expanded neutral zone. Thus, when there is a sudden speed change operation of the HST out of the neutral zone, for example, when the speed change operation device held in a certain speed position is moved suddenly, or when there is a sudden speed change operation that increases the output speed of the HST beyond the speed range corresponding to the expanded neutral zone, the sudden speed change operation is directly reflected in output change of HST, thereby causing a shock.

BRIEF SUMMARY OF THE INVENTION

An object of the present invention is to provide a hydrostatic stepless transmission (HST) with a mechanism for moderating output change of the HST even when there is a sudden speed change operation regardless of the output stage of the HST, wherein the HST with the mechanism is preferably disposed compactly in an apparatus such as a transaxle.

To achieve the object, a hydrostatic stepless transmission comprises a hydraulic pump and a hydraulic motor, at least one of the hydraulic pump and motor being variable in displacement; a closed circuit for fluidly connecting the hydraulic pump and motor to each other, the closed circuit including a pair of oil passages between the hydraulic pump and motor, one of the oil passages being hydraulically higher-pressured and the other being hydraulically depressed when the hydraulic pump delivers oil to the hydraulic motor; a speed change operation device for changing output rotational speed of the hydraulic motor; and a leak valve connected to the speed change operation device. The leak valve is connected to the closed circuit so that when the speed change operation device is suddenly moved, the leak valve allows oil to leak from the higher-pressured oil passage to an area having a hydraulic pressure lower than the higher-pressured oil passage, and then stops oil leakage when movement of the speed change operation device is slowed or stopped. Therefore, the leak valve moderates the change of hydraulic pressure in the HST closed circuit even when the speed change operation device is suddenly operated.

The leak valve does not allow oil leakage while the speed change operation device is gradually operated, thereby effectively using the capacity of HST for acceleration or deceleration of the vehicle.

The leak valve may fluidly connect the higher-pressured oil passage of the closed circuit to an oil sump out of the closed circuit so as to leak oil from the higher-pressured oil passage to the oil sump. Therefore, only the higher-pressured oil passage of the two oil passages in the closed circuit may be required to be connected to the leak valve, thereby avoiding complicating the closed circuit.

Alternatively, the leak valve may fluidly connect the higher-pressured oil passage of the closed circuit to the depressed oil passage of the closed circuit so as to bypass oil from the higher-pressured oil passage to the depressed oil passage. In that case, the leaked oil would not flow into the oil sump, out of the closed circuit, thereby reducing transmission noise.

Further, the speed change operation device may be connected to a movable swash plate of the variable displacement hydraulic pump or motor through a speed change link member, and the leak valve may have a leak oil passage for leaking oil from the higher-pressured oil passage of the closed circuit to an area having a hydraulic pressure lower than the higher-pressured oil passage. The leak valve may include a movable cylinder, a biasing member, and a piston.

The cylinder is movable between a valve closing position for cutting off the leak oil passage and a valve opening position for opening the leak oil passage. The biasing member is provided for biasing the cylinder to the valve closing position. The piston is slidably disposed in the cylinder and connected to the speed change link member. When the speed change operation device is suddenly operated, the cylinder is moved together with the piston to the valve opening position, and then, by stopping movement of the speed change operation device, the cylinder returns to the valve closing position by biasing force of the biasing member while the piston is kept in its shifted position. While the speed change operation device is gradually operated, the cylinder is kept in the valve closing position regardless of movement of the piston.

Preferably, the piston is formed with an orifice that is opened to areas of a chamber in the cylinder which are on opposite sides of the piston. When the piston is suddenly moved, passage of oil through the orifice is resisted so as to move the cylinder together with the piston. Preferably, a reed valve is provided on the piston to open and close the orifice. When the piston is suddenly moved, the reed valve closes the orifice. The simple, compact and economic structure of the leak valve utilizes the movement of the cylinder together with the piston for opening the leak oil passage for leaking oil from the higher-pressured oil passage of the closed circuit.

The movement of the piston and the cylinder may be substantially vertical. The HST may have a center section forming the closed circuit therein, wherein the cylinder may be movably disposed in the center section. These structures are advantageous for making a compact apparatus, such as a transaxle, including the HST.

With respect to the connection of the leak valve with the speed change link member, a second biasing member may be provided for returning the speed change operation device, the speed change link member and the piston to their neutral position. If the speed change link member is a rotary member, a cam may be provided for connecting the speed change link member to the piston.

These, further, and other objects, features and advantages of the present invention will be explained more thoroughly in the following detailed description.

BRIEF DESCRIPTION OF THE DRAWINGS/FIGURES

FIGS. 16a–b illustrate a leak valve according to a third embodiment of the present invention, wherein (a) is a cross-sectional view of the leak valve, and (b) shows arrangement of inlet ports in an outer cylinder of the leak valve.

DETAILED DESCRIPTION OF THE INVENTION

A vehicle equipped with a hydrostatic stepless transmission (hereinafter, "HST") according to the present invention will be described below. In the present embodiment, a mower tractor 10, typical of a vehicle equipped with the present invention, is disclosed. However, the present invention may be applicable to any other vehicle and another transmission, such as a hydraulic-and-mechanical stepless transmission (HMT).

Figure 1:
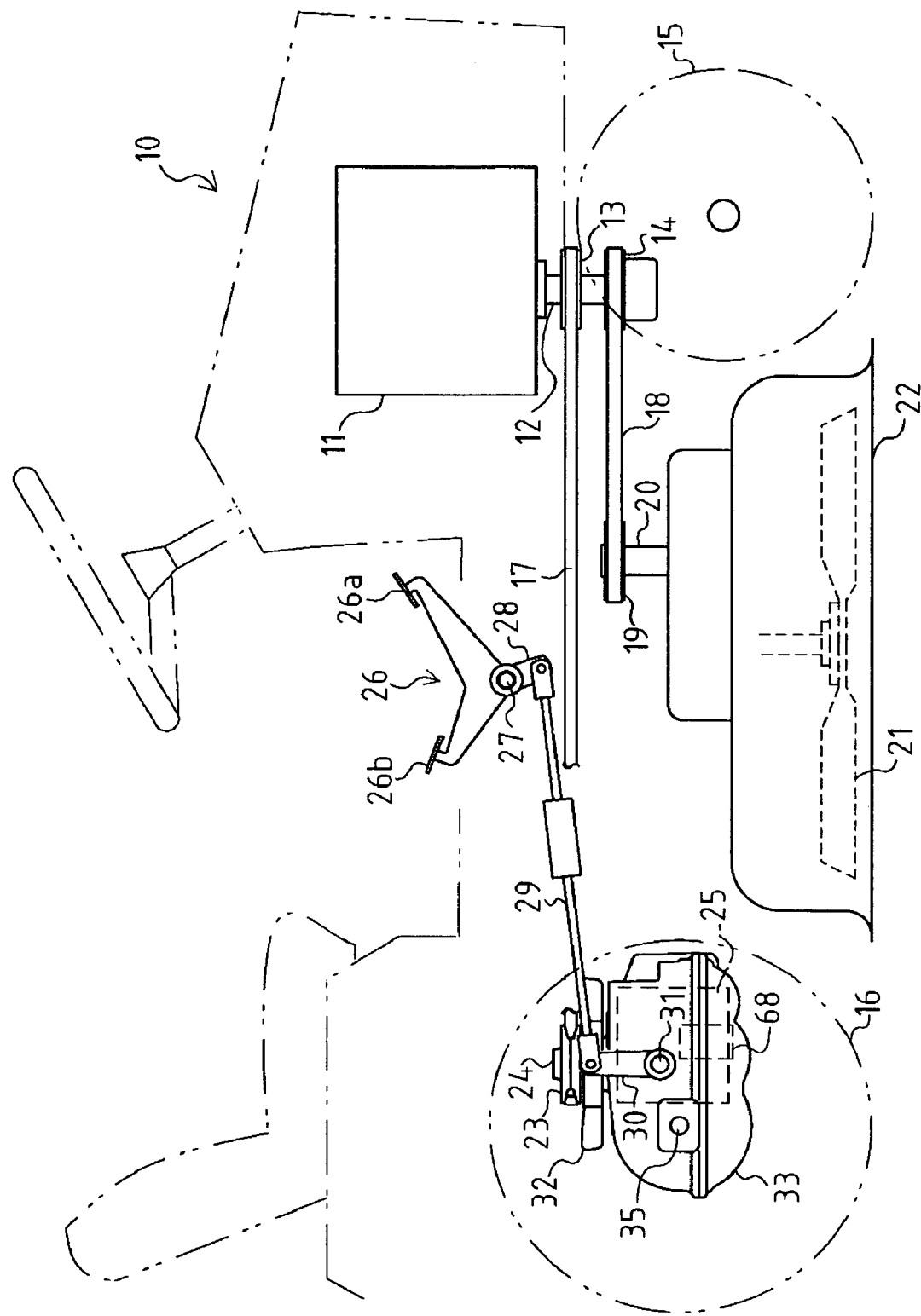
FIG. 1 is a side view of a mower tractor serving as a vehicle having a hydrostatic stepless transmission (HST) with a mechanism for moderating output change of the HST according to the present invention.

As shown in FIG. 1, the mower tractor 10 is provided on its front portion with right and left steerable wheels 15, and on its rear portion with right and left drive wheels 16. An engine 11, as a prime mover, is disposed on the front portion of the vehicle body. Output of the engine 11 is inputted into an HST 25 disposed on the rear portion of the vehicle body through a drive belt 17 wound between a pulley 13 engaged on a substantially vertical output shaft 12 extended downward from the engine 11 and a pulley 23 engaged on a substantially vertical input shaft 24 of the HST 25. Power transferred to the HST 25 is varied in speed therein, and then transferred to left and right axles 35 extended laterally from a transaxle housing 33 incorporating the HST 25, thereby rotating the drive wheels 16 engaged on the axles 35.

An accelerator 26 serving as the speed change operation device for changing traveling speed of the mower tractor 10 and selecting either forward or backward traveling direction thereof is pivotally provided, like a seesaw, on a footboard of a driver's part of the vehicle body. The accelerator 26 is provided on its front and rear ends with pedals 26a and 26b, respectively. The vehicle body travels forward by depressing the front pedal 26a, and travels backward by depressing the rear pedal 26b.

The accelerator 26 is pivoted at its center portion on a lateral pivot 27, and an arm 28 is fixed onto the pivoted center portion of the accelerator 26 so as to be rotatable integrally with the accelerator 26. A speed change lever 30 is fixed onto an operation shaft 31 extended laterally (in this embodiment, leftward) outward from the transaxle housing 33, and is connected to the arm 28 through a rod 29, thereby operatively connecting the accelerator 26 to the operation shaft 31 for operating the HST 25.

A mower deck 22 is disposed below a center portion of the mower tractor 10. A rotary cutter 21 for cutting grass or other plants is located in the mower deck 22. An input shaft 20 of the rotary cutter 21 is extended upward from the mower deck 22. Power of the engine 11 is transferred to the rotary cutter 21 in the mower deck 22 through a drive belt 18 interposed between a pulley 14 engaged on the output shaft 12 of the engine 11 and a pulley 19 engaged on an input shaft 20 extended upward from the mower deck 22 as an input shaft of the rotary cutter 21, thereby rotating the rotary cutter 21.

Figure 2:
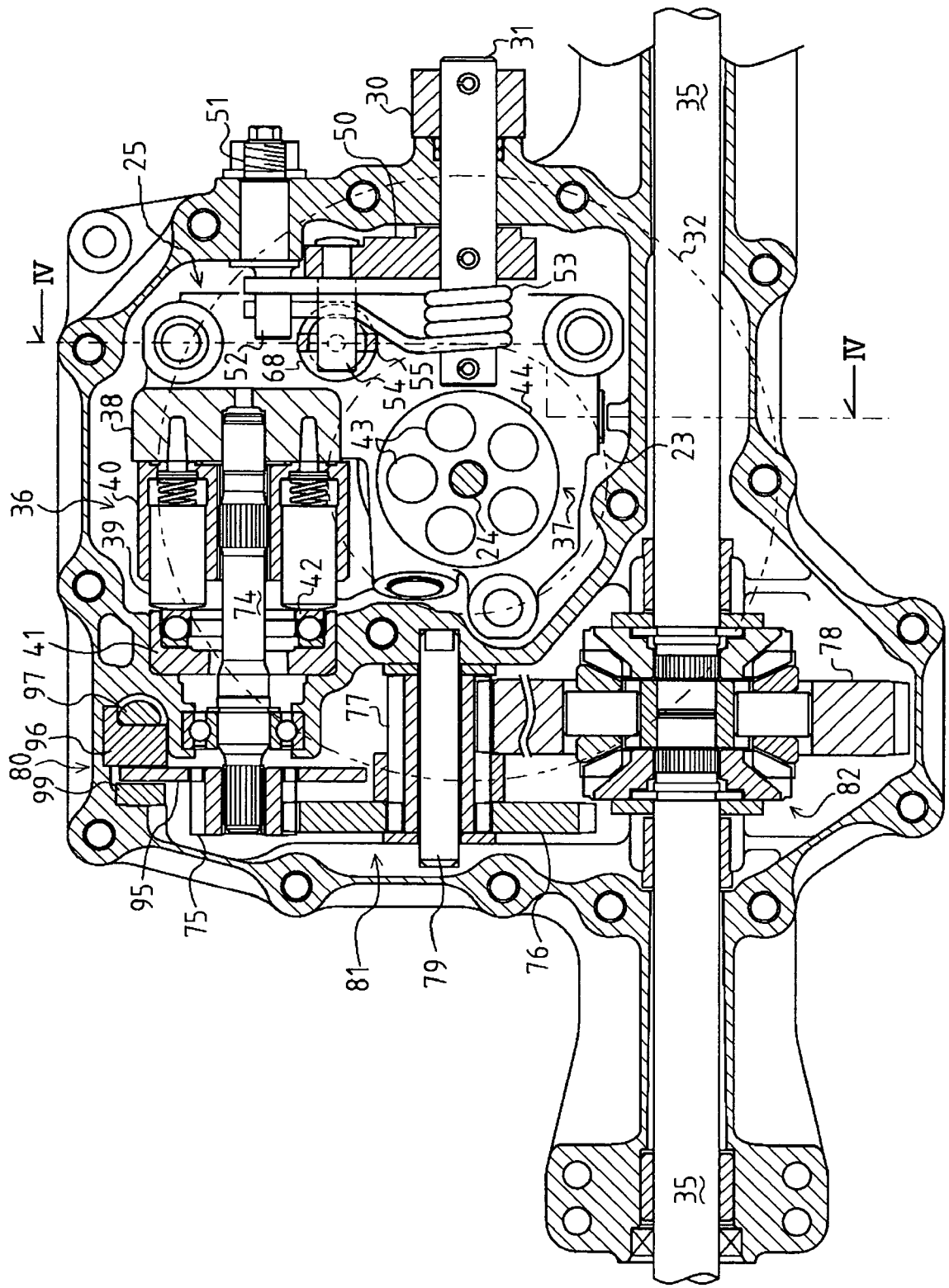
FIG. 2 is a plan view of the HST.
Figure 3:
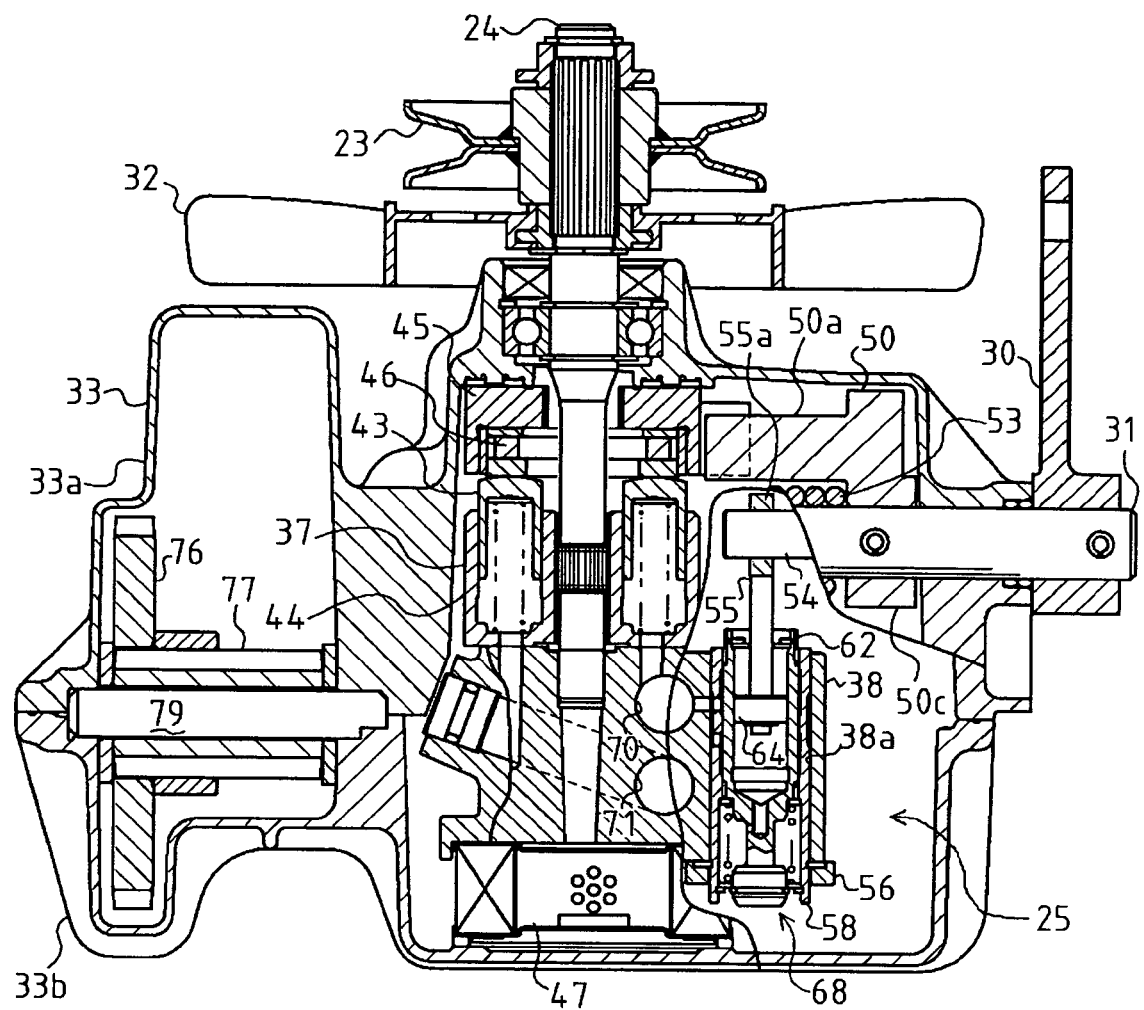
FIG. 3 is a cross-sectional view of the HST involving a hydraulic pump thereof.
Figure 4:
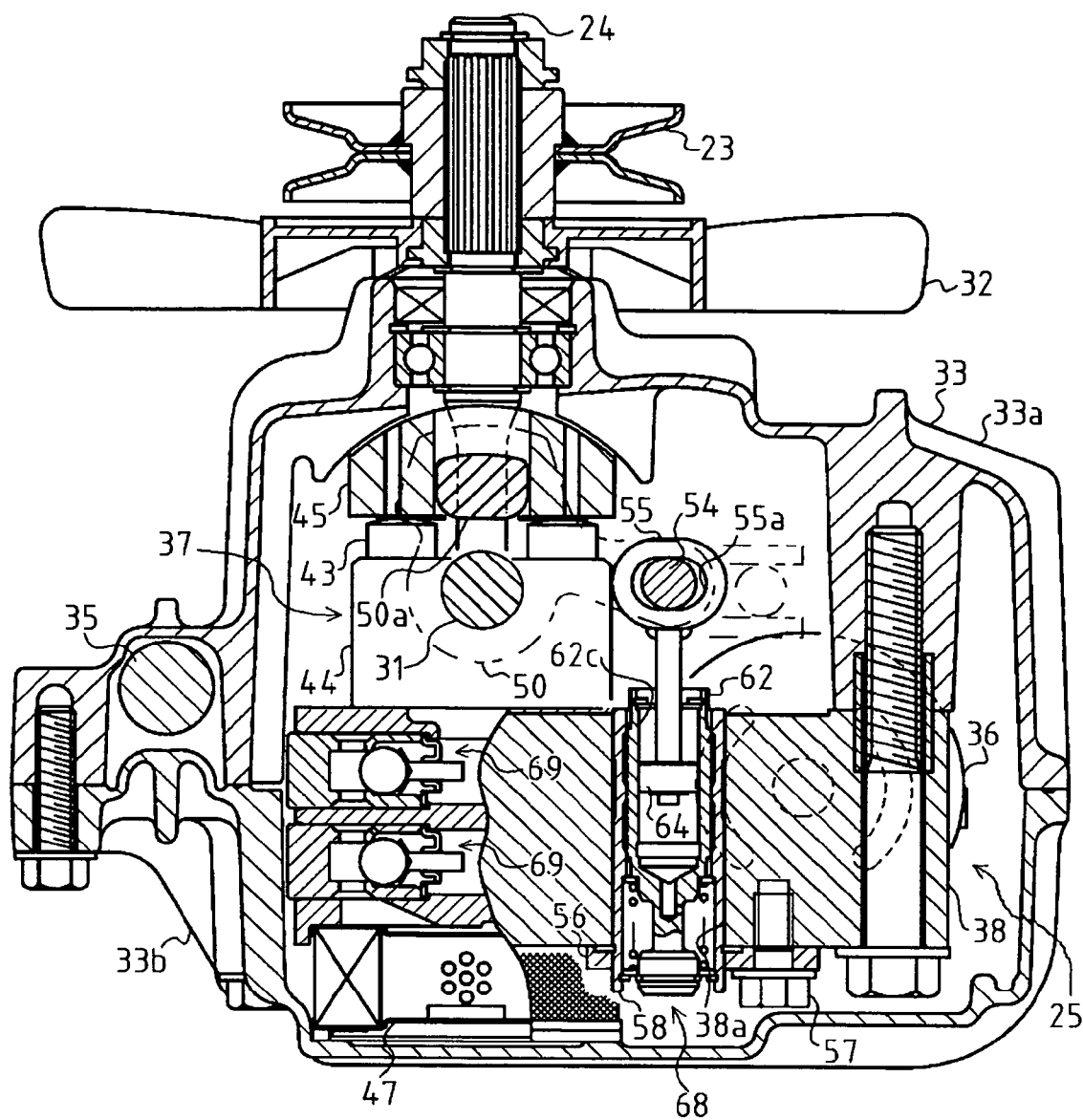
FIG. 4 is a cross-sectional view of the HST of FIG. 2, taken along line IV—IV.

One construction of the HST 25 will now be described. As shown FIGS. 2 to 4, the HST 25 is disposed in the transaxle housing 33 dividable into an upper member 33a and a lower member 33b. The HST 25 includes a hydraulic pump 37, a hydraulic motor 36, and a center section 38. In the transaxle housing 33, a brake assembly 80, a deceleration gear assembly 81 and a differential assembly 82 are disposed together with the HST 25. The transaxle housing 33 is filled in with oil so as to serve as an oil sump supplying hydraulic oil for the HST 25 and lube for gears and the like therein.

The input shaft 24 is extended upward from the transaxle housing 33, and the pulley 23 and a cooling fan 32 are engaged on the portion of the input shaft 24 above the transaxle housing 33. The input shaft 24 receives its rotary power from the engine 11 through the above-mentioned belt type drive mechanism comprising the pulleys 13 and 23 and belt 17.

The input shaft 24 is fitted into the hydraulic pump 37 as a pump shaft for rotating the hydraulic pump 37 to supply hydraulic oil to the hydraulic motor 36. The variable displacement hydraulic pump 37 comprises a cylinder block 44 and pistons 43 substantially vertically slidably inserted into the cylinder block 44, and a movable swash plate 45 above the cylinder block 44. The swash plate 45 is slidably rotatably fitted onto a ceiling of the transaxle housing 33, and integrally provided at its bottom with a thrust bearing 46 against which heads of the pistons 43 are pressed by respective springs.

In the transaxle housing 33, a rotary arm 50 serving as a speed change link member is fixed onto the operation shaft 31 and a projection 50a of the rotary arm 50 is inserted into the swash plate 45, so that, by rotating the speed change lever 30, the operation shaft 31 and rotary arm 50 are rotated integrally so as to change the angle of the swash plate 45, thereby adjusting the capacity of hydraulic pump 37, i.e., the amount of oil delivered from the hydraulic pump 37 to the hydraulic motor 36, and selecting the direction of oil circulating between the pump 37 and motor 36.

In addition, an adjuster 51 for adjusting the position of the rotary arm 50 is attached onto the transaxle housing 33 so as to adjust the position of rotary arm 50 relative to the neutral position of the movable swash plate 45.

The vertically axial hydraulic pump 37 and the horizontally axial hydraulic motor 36 are slidably rotatably mounted onto the center section 38. The center section 38 is fixed to the transaxle housing 33 by bolts so as to be distant from the bottom of the transaxle housing 33. An oil filter 47 is disposed between the bottom of center section 38 and the bottom of housing 33.

Figure 9:
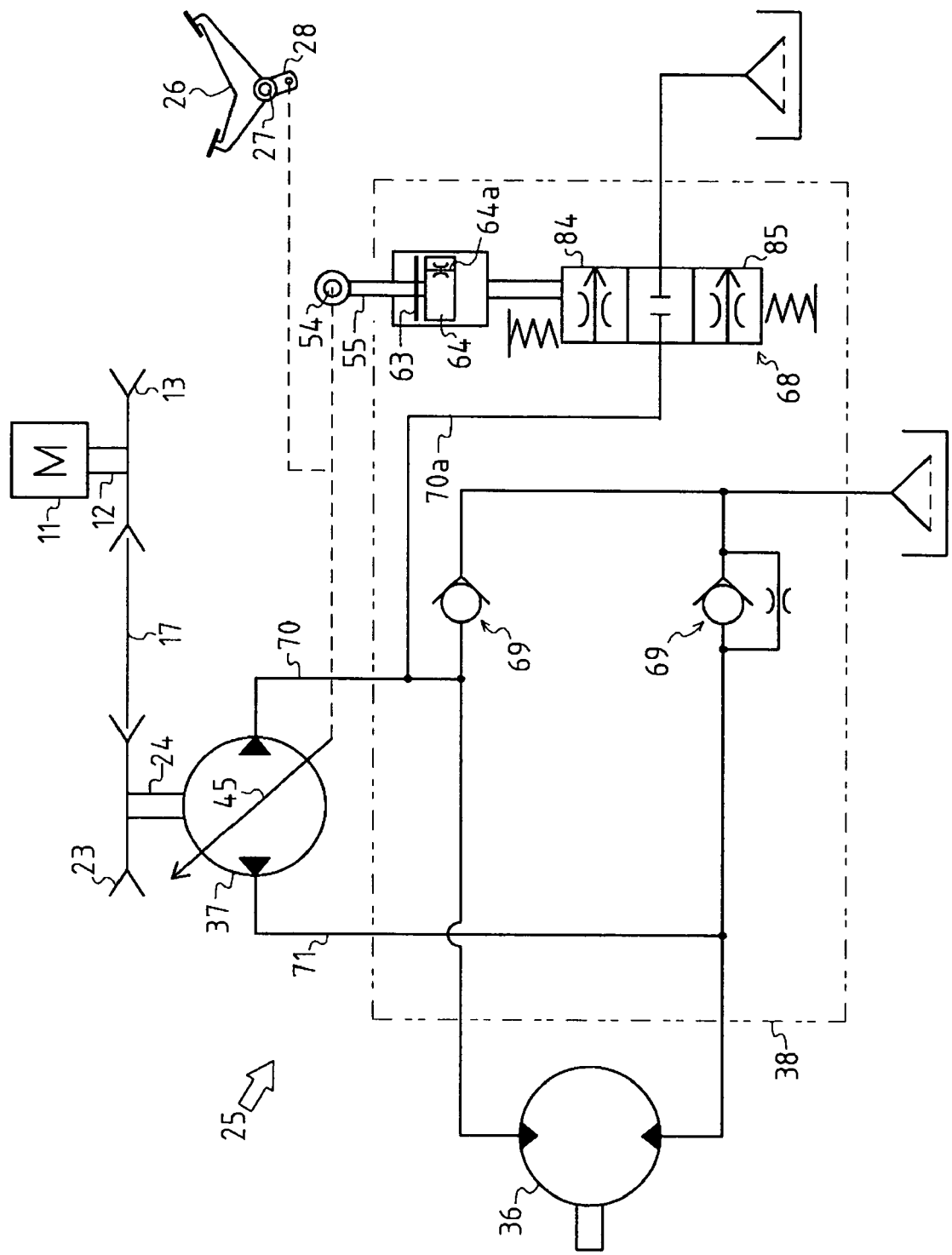
FIG. 9 is a hydraulic circuit diagram of an HST having a leak valve.

In the center section 38 are formed two vertically aligned oil passages 70 and 71 serving as a closed circuit for fluidly connecting the hydraulic pump 37 to the hydraulic motor 36, as shown in FIG. 9. When the HST 25 is set for forward traveling of the vehicle, the upper oil passage 70 is hydraulically higher-pressured and the lower oil passage 71 is hydraulically depressed. In the center section 38 are provided two check valves 69, which allow oil from the oil sump in the housing 33 through the oil filter 47 to be charged to the respective oil passages 70 and 71, and prevent oil from flowing from the respective oil passages 70 and 71 to the oil sump. The center section 38 is further provided with a leak valve 68 for preventing sudden change of output rotation of the HST 25, as described in greater detail below.

The hydraulic motor 36 is connected to a vertical side surface of the center section 38 opposite to the axles 35, with respect to the hydraulic pump 37. The rotational axes of the hydraulic motor 36 and the hydraulic pump 37 are disposed in planes that mutually intersect at a right or 90° angle.

The fixed displacement hydraulic motor 36 comprises a cylinder block 40, pistons 39 substantially horizontally slidably inserted into the cylinder block 40, and a fixed swash plate 41. The swash plate 41 is integrally provided with a thrust bearing 42 against which the pistons 39 are pressed by respective springs.

A gear 75 is fixedly engaged on one end of an output shaft 74, i.e., a motor shaft of the hydraulic motor 36. The brake assembly 80 is constructed with a friction disc 95 integrally provided on the gear 75 so as to apply braking force to the output shaft 74. The brake assembly 80 comprises a pressure member 96, a cam 97 abutting against the pressure member 96, and a fixed brake pad 99. The brake pad 99 is fixed to a wall of the transaxle housing 33, and the pressure member 96 is fitted to a wall of the transaxle housing 33 so as to be slidable by rotation of the cam 97. The friction disc 95 is disposed between the pressure member 96 and brake pad 99, so that, by rotating the cam 97, the press member 96 is moved to press the friction disc 95 against the brake pad 99, thereby applying braking force to the output shaft 74.

The gear 75 engaged on the output shaft 74 meshes with a gear 76 rotatably engaged on a counter shaft 79 supported at its opposite ends by outer wall and inner partition of the transaxle housing 33. A bull gear 78 as an input gear of the differential assembly 82 meshes with a gear 77 formed on a boss portion of the gear 76. The gears 75, 76, 77 and 78 constitute the deceleration gear assembly 81 for decelerating output rotation of the hydraulic motor 36 and transmitting it to the differential assembly 82.

The right and left coaxial axles 35 are differentially connected to each other through the differential assembly 82, rotatably supported by the transaxle housing 33 and extended rightward and leftward from the transaxle housing 33. The drive wheels 16 are engaged on the outer ends of respective axles 35.

As the above mentioned, output rotation speed of the engine 11 is changed by the HST 25, reduced by the deceleration gear assembly 81, adjusted by the differential assembly 82, and then, transmitted to the right and left axles 35 so as to rotate the drive wheels 16.

The leak valve 68 is provided in the center section 38 to be connected to the closed oil circuit formed therein. When the accelerator 26 serving as a speed change operation device is operated suddenly (in a speed over a certain set operation speed), the speed change lever 30 is operated suddenly resulting in an unexpected sudden change of output rotation of the HST 25. The leak valve 68 is provided for preventing such sudden speed change.

Figure 5:
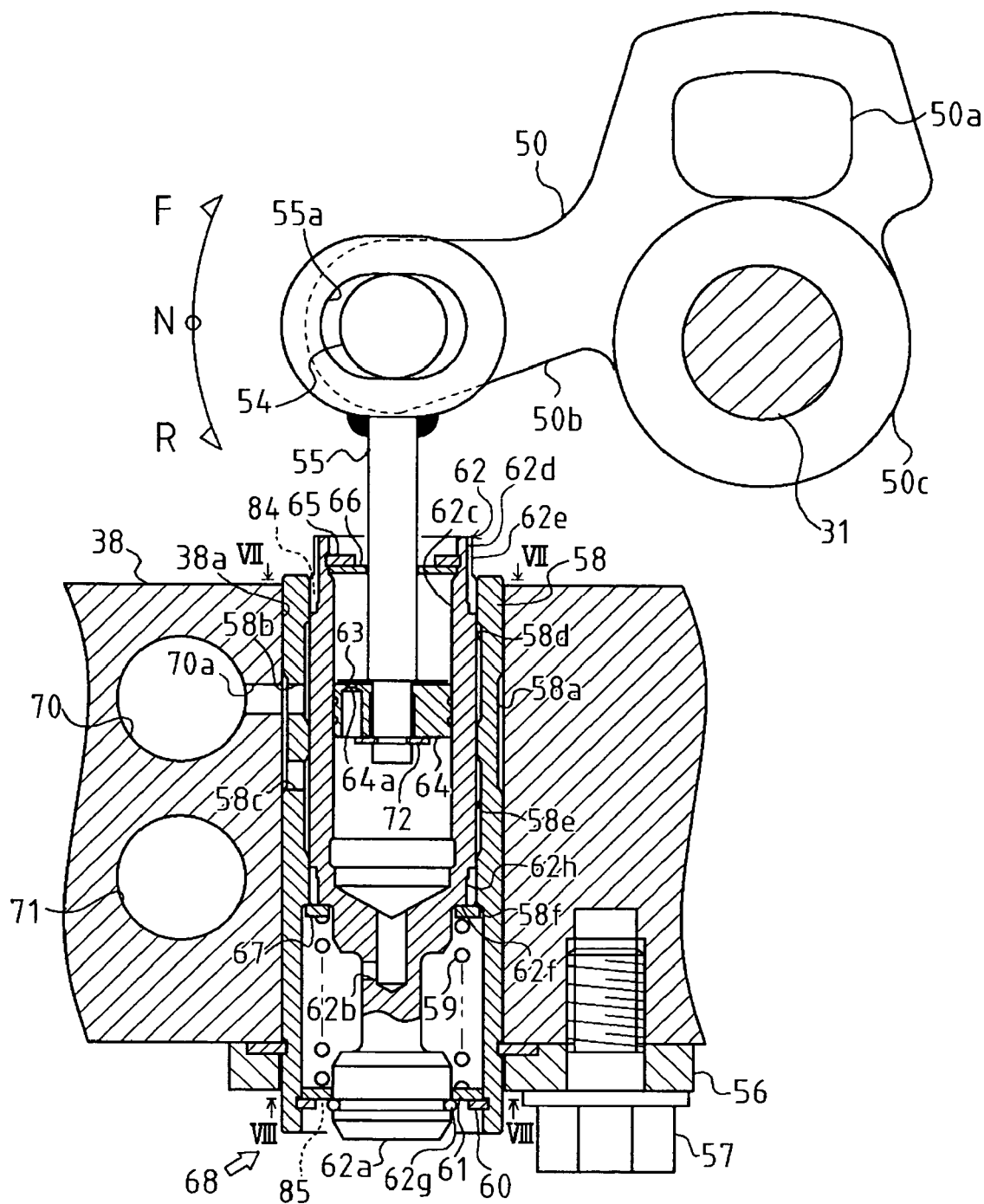
FIG. 5 is a cross-sectional view of a leak valve according to a first embodiment of the present invention.

The speed change linkage with the leak valve 68 will now be described in accordance with FIGS. 2 to 5. Referring to FIG. 5 showing the leak valve 68 in the neutral state, the rotary arm 50 serving as a speed change link member has a boss portion 50c fixed on the horizontal operation shaft 31. The rotary arm 50 is integrally formed above the boss portion 50c with the projection 50a horizontally projecting to be engaged to the movable swash plate 45. The rotary arm 50 is integrally formed with a leak valve arm portion 50b extended laterally from the boss portion 50c. A horizontal pin 54 projects from the leak valve arm portion 50b.

The adjuster 51 has an eccentric pin 52 horizontally projecting into the transaxle housing 33. A neutral return biasing member is provided around the operation shaft 31 in or out of the housing 33. In this embodiment, a biasing spring 53 coiled on the operation shaft 31 serves as the biasing member and is disposed in the housing 33. The biasing spring 53 has its two end portions crossed and extended to pinch the pin 54 and the eccentric pin 52.

The adjuster 51 is operable outside the transaxle housing 33 to be screwed in and out so as to adjust the position of eccentric pin 52, thereby adjusting the neutral operation position of the rotary arm 50 corresponding to the neutral position of the movable swash plate 45 of the hydraulic pump 37.

The biasing spring 53 biases the position of the speed change linkage that extends from the accelerator 26, comprising the rotary arm 50, the operation shaft 31 and speed change lever 30, to its neutral position, and thereby biasing the swash plate 45 to its neutral position. When either the pedal 26a or 26b of the accelerator 26 is depressed, the pin 54 integral with the rotary arm 50 is rotated while the eccentric pin 52 remains fixed resulting in the gap between the crossed end portions of biasing spring 53 being widened so as to create the neutral biasing force. Thus, when the depressed pedal 26a or 26b of accelerator 26 is released from the depressing force, the speed change linkage returns to the neutral position so as to return the swash plate 45 to its neutral position.

A piston 64 is provided in the leak valve 68, and a vertical piston rod 55 is extended upward from the leak valve 68. A top portion of the piston rod 55 is formed into a cam ring 55a into which the horizontal pin 54 is inserted. The cam ring 55a is horizontally widened so as to allow the horizontal movement of pin 54 caused by rotating the pin 54 together with the rotary arm 50. The pin 54 is vertically tightened in the cam ring 55a. Therefore, the cam ring 55a converts the rotation of pin 54 to substantially vertical linear movement of the piston rod 55.

As shown in FIG. 5, the leak valve 68 has a vertical outer cylinder 58 fixed in the center section 38, and a vertical inner cylinder 62 slidably fitted in the outer cylinder 58. The outer cylinder 58 is tightly fitted in a vertical valve hole 38a formed in the center section 38. The lower open end of outer cylinder 58 is extended downward from the center section 38 so as to be open to the oil sump below the center section 38 in the transaxle housing 33, and provided thereon with a retaining plate 56 contacting the bottom surface of center section 38, so that the outer cylinder 58 is fastened together with the retaining plate 56 to the center section 38 by a bolt 57.

The piston 64 is slidably fitted in a piston chamber 62c formed in the inner cylinder 62 and fluidly sealed against the inner wall of piston chamber 62c. A vertical hole is bored through the piston 64 for connecting areas of the chamber 62c above and below the piston 64. Alternatively, an oil passage may be formed within the inner cylinder 62 to connect the upper and lower areas of the chamber 62c, however, the vertical hole bored in the piston 64 can be provided more easily.

An upwardly opening top area of the vertical hole in the piston 64 is narrowed to serve as an orifice 64a. The piston 64 is provided on its top surface with an elastic reed valve 63 covering the orifice 64a. The reed valve 63, the piston 64, and a retaining ring 72 preventing the piston 64 from falling off of the piston rod 55 are fixed together on a lower end portion of the piston rod 55.

Figure 6:
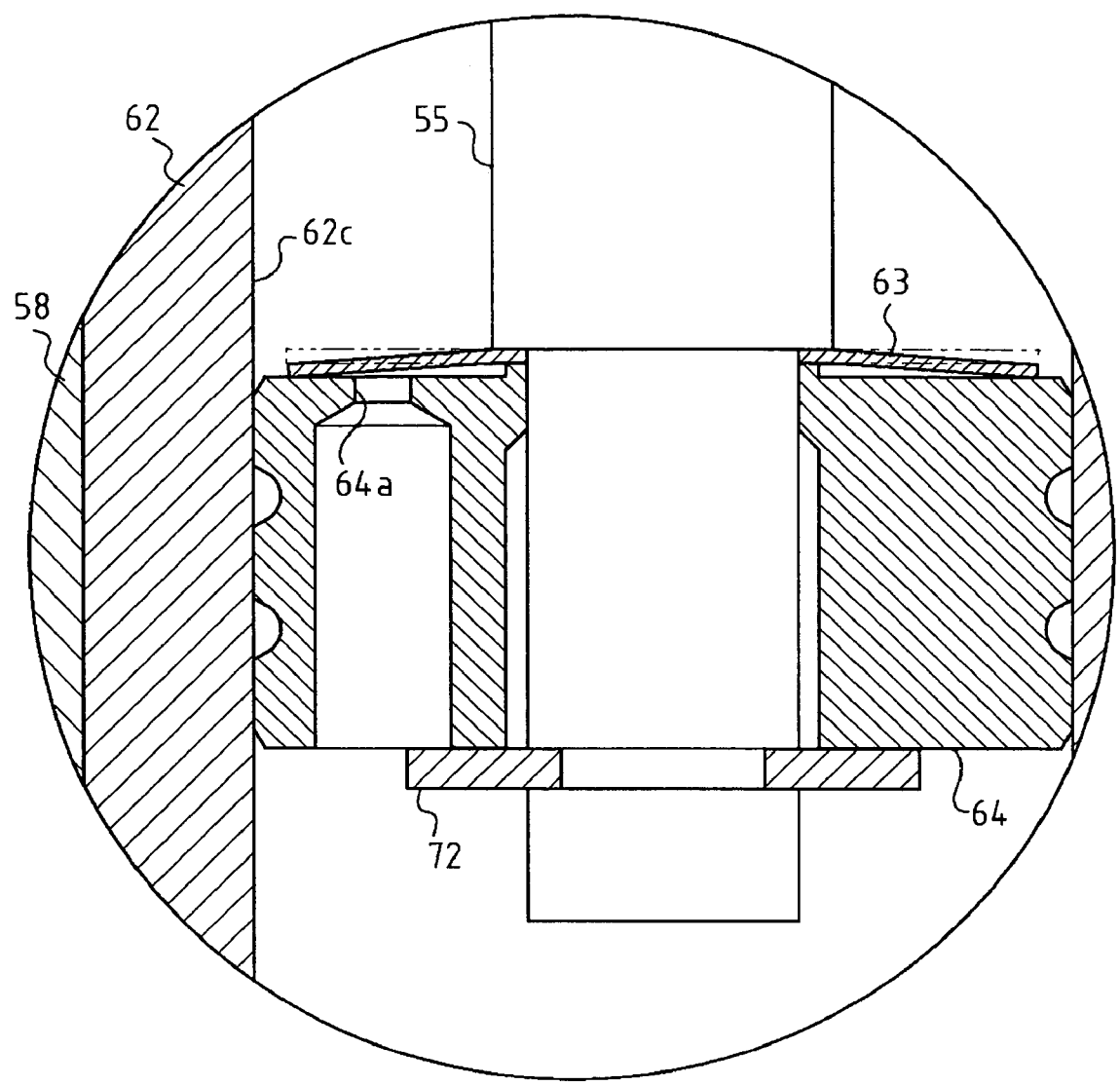
FIG. 6 is an enlarged cross-sectional view of a piston in the leak valve of FIG. 5.

As shown in FIG. 6, the reed valve 63 is initially spaced from the top surface of the piston 64 as drawn in phantom lines, and if the piston 64 receives downward pressure, the reed valve 63 is bent downward to contact the top surface of piston 64 so as to close the upper opening of orifice 64a as drawn in solid lines.

The outer cylinder 58 is formed with an annular inlet groove 58a on its outer periphery and with upper and lower annular outlet grooves 58d and 58e on its inner periphery. The outer cylinder 58 is formed with upper and lower connection ports 58b and 58c, wherein the upper connection port 58b spans between an upper portion of the inlet groove 58a and a lower portion of the upper outlet groove 58d, and the lower connection port 58c spans between a lower portion of the inlet groove 58a and an upper portion of the lower outlet groove 58e. In the center section 38 is formed a connection port 70a extended from the upper oil passage 70, which is higher-pressured when the HST 25 is set for forward traveling. The connection port 70a is constantly open to the upper portion of inlet groove 58a.

The upper cylindrical portion of the inner cylinder 62 is slidably fixed in the outer cylinder 58 and the piston chamber 62c is formed therein. A lower portion of the inner cylinder 62, below the upper cylindrical portion, is narrowed and its bottom end serves as a cylinder bottom 62a. A cover 66 with a retaining ring 65 is provided in a top portion of the inner cylinder 62 so as to close the piston chamber 62c while allowing the piston rod 55 to slidably pass therethrough.

The narrowed portion of inner cylinder 62, below its upper cylindrical portion, is formed therein with an outward open port 62b extended downward from the piston chamber 62c so as to bring the piston chamber 62c into communication with the inner space of the outer cylinder 58. Accordingly, oil filled inside the transaxle housing 33 is supplied to the piston chamber 62c through the oil passage 62b, whereby the piston chamber 62c is filled with oil. Namely, hydraulic oil for the HST 25 is also used for operating the leak valve 68 so as to save space and cost.

A spring 59 is disposed around the narrowed lower portion of inner cylinder 62 in the outer cylinder 58 to serve as a biasing member for returning the inner cylinder 62 to its initial position (a valve closing position). A lower end of the cylindrical portion of the inner cylinder 62 is stepped to form a downwardly horizontal surface 62f, and an inner peripheral surface of the outer cylinder 58 is stepped at its intermediate portion to form a downwardly horizontal surface 58f. An upper spring receiving plate 67 is vertically movably disposed above the spring 59 and below the surfaces 58f and 62f. A ring 62g is fixed on the cylinder bottom 62a, and a retaining ring 60 is fixed to the inner peripheral bottom portion of outer cylinder 58. A lower spring receiving plate 61 is vertically movably disposed below the spring 59 and above the retaining rings 60 and 62g.

The surface 58f restricts upward movement of the upper spring receiving plate 67, and the retaining ring 60 restricts downward movement of the lower spring receiving plate 61. The inner cylinder 62 is moved upward or downward relative to the outer cylinder 58 against the biasing force of spring 59 toward the above-mentioned valve closing position.

When the inner cylinder 62 is moved downward relative to the outer cylinder 58, the surface 62f of inner cylinder 62 pushes down the upper spring receiving plate 67 so as to compress the spring 59. Afterward, the spring 59 returns by pushing up on the inner cylinder 62 through the upper spring receiving plate 67 contacting the surface 62f so as to return the inner cylinder 62 to its initial (valve closing) position.

When the inner cylinder 62 is moved upward relative to the outer cylinder 58, the ring 62g on the cylinder bottom 62a of inner cylinder 62 pushes up the lower spring receiving plate 61 so as to compress the spring 59. Afterward, the spring 59 returns by pushing down the inner cylinder 62 through the lower spring receiving plate 61 contacting the ring 62g so as to return the inner cylinder 62 to the valve closing position.

Figure 8:
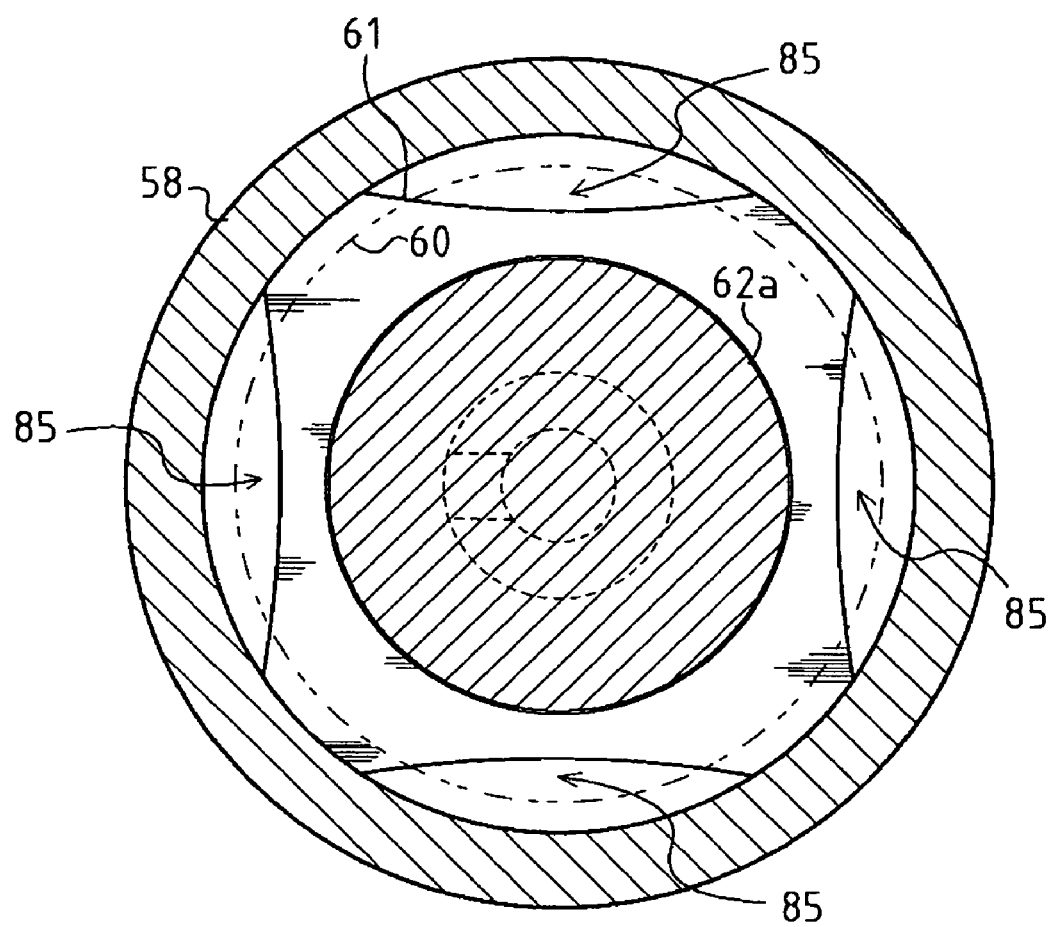
FIG. 8 is a cross-sectional view showing the construction of a lower portion of the leak valve of FIG. 5, taken along line VIII—VIII.

As shown in FIGS. 5 and 8, gaps are formed between the inner periphery of lower spring receiving plate 61 and the outer periphery of cylinder bottom 62a (with the ring 62g) so as to serve as a lower valve port 85 for passing oil between the inner space of outer cylinder 58 and the oil sump in the transaxle housing 33 below.

The inner cylinder 62 is narrowed or notched on its outer periphery to form an annular groove 62h just above the surface 62f abutting against the upper spring receiving plate 67. When the inner cylinder 62 slid upward relative to the outer cylinder 58 reaches an upper valve opening position higher than the initial valve closing position, the groove 62h is connected to the groove 58e formed on the inner periphery of the outer cylinder 58, thereby completing a leak oil passage from the oil passage 70 to the lower valve port 85 through the connection port 70a, the groove 58a, the connection port 58c, and the grooves 58e and 62h.

Figure 7:
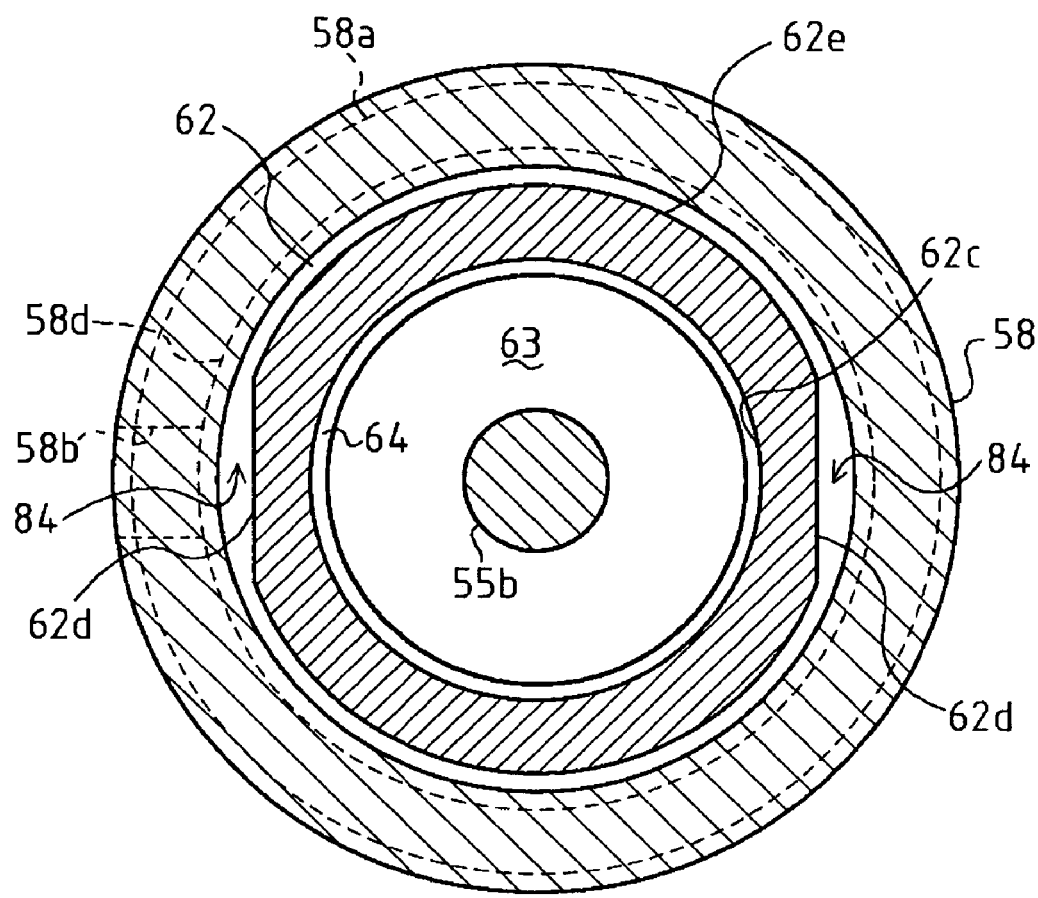
FIG. 7 is a cross-sectional view showing the construction of an upper portion of the leak valve of FIG. 5, taken along line VII—VII.

As shown in FIGS. 5 and 7, the top portion of inner cylinder 62 is also narrowed and notched on its outer periphery to form an annular groove 62e so as to ensure a gap from the inner peripheral surface of outer cylinder 58. The gap serves as an upper valve port 84 for passing oil between the inner space of outer cylinder 58 and the oil sump in the transaxle housing 33 thereabove.

When the inner cylinder 62 slid downward relative to the outer cylinder 58 reaches a lower valve opening position lower than the initial valve closing position, the groove 62e is connected to the groove 58d formed on the inner periphery of the outer cylinder 58, thereby completing a leak oil passage from the oil passage 70 to the upper valve port 84 through the connection port 70a, the groove 58a, the connection port 58b, and the grooves 58d and 62e.

As mentioned above, the valve ports 84 and 85 opened to the oil sump in the transaxle housing 33 are formed on the top and bottom portions of the outer cylinder 58 respectively. The upper valve port 84 can also remove air bubbles from the leak oil passage easily.

When the inner cylinder 62 is disposed in the valve closing position, the leak valve 68 is kept closed to the oil sump (the leak valve 68 cuts off the leak oil passage), and when the inner cylinder 62 slid upward or downward in the outer cylinder 58 reaches either the upper or lower valve opening position, the leak valve 68 is opened to the oil sump (the leak valve 68 completes the leak oil passage).

Figure 10:
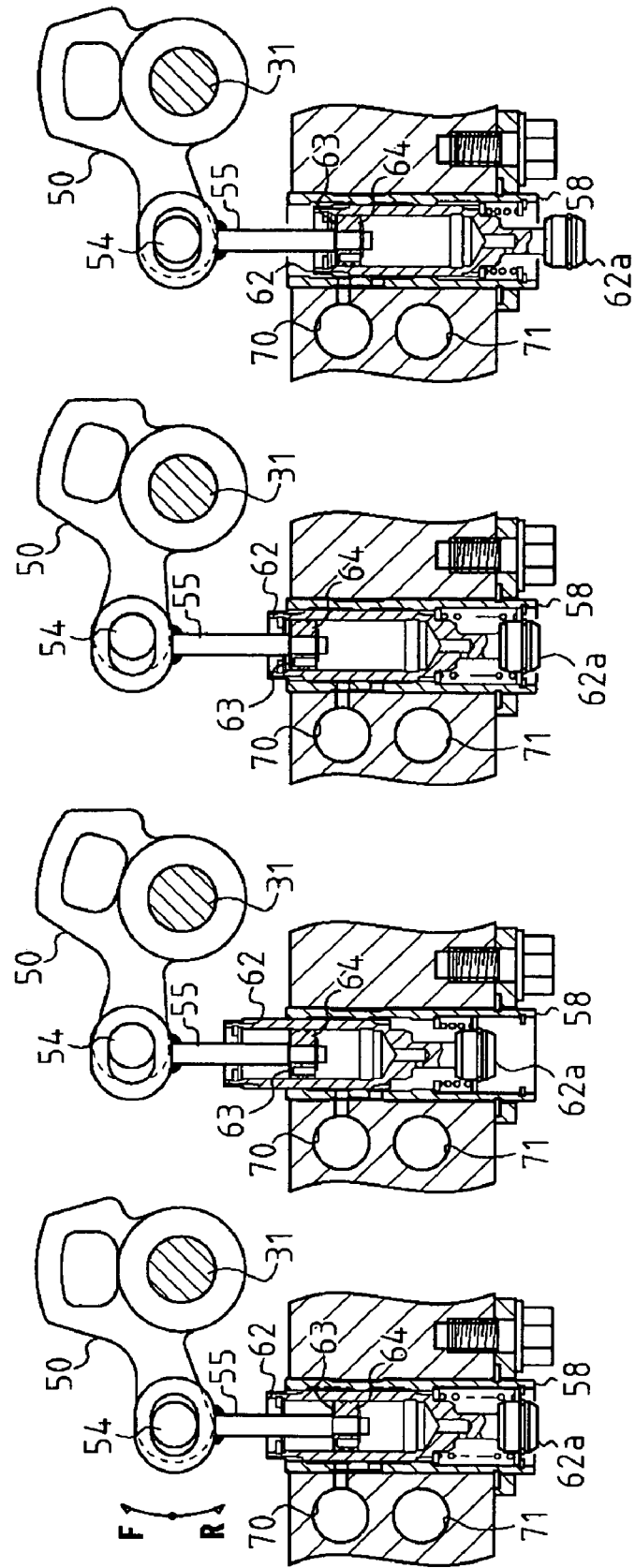
FIG. 10 illustrates actuation of the leak valve when the vehicle travels forward.
Figure 11:
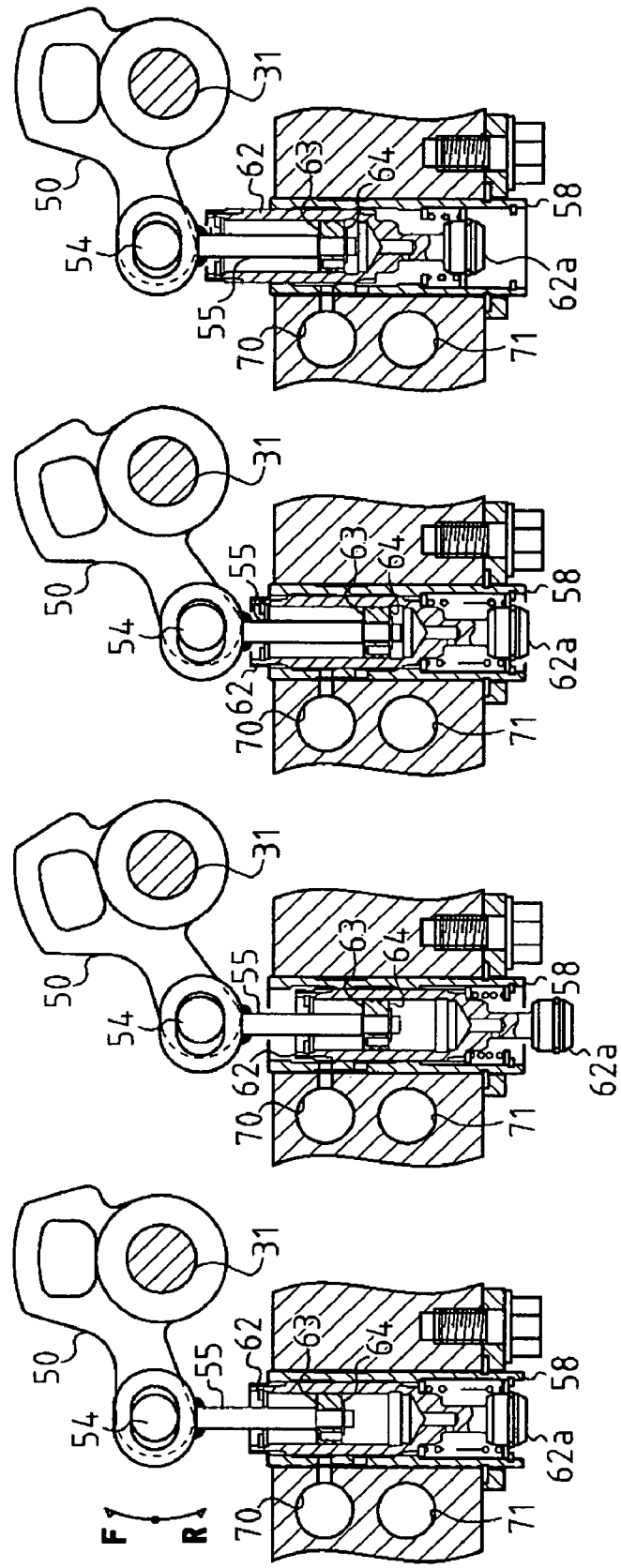
FIG. 11 illustrates actuation of the leak valve when the vehicle travels backward.

As shown in FIGS. 5 and 9 to 11, when the HST 25 is neutral, that is, when the movable swash plate 45 of the hydraulic pump 37 is disposed at its neutral operation position, the leak valve 68 constructed as described above is set in a neutral state (S21 in FIG. 10 or S31 in FIG. 11), the piston 64 is disposed at its neutral position, and the inner cylinder 62 is disposed at the valve closing position.

When the inner cylinder 62 is moved together with the piston 64 upward to the upper valve opening position, the leak valve 68 is turned into a downwardly open state (S22 in FIG. 10 and S34 in FIG. 11), where the groove 58e on the inner periphery of the outer cylinder 58 communicates with the groove 62h on the outer periphery of the inner cylinder 62 so as to complete the leak oil passage from the oil passage 70 to the opened lower valve port 85, thereby draining oil from the oil passage 70 into the oil sump in the transaxle housing 33 below the leak valve 68.

On the other hand, when the inner cylinder 62 is moved together with the piston 64 downward to the lower valve opening position, the leak valve 68 is turned into an upwardly open state (S24 in FIG. 10 and S32 in FIG. 11), where the groove 58d on the inner periphery of the outer cylinder 58 communicates with the groove 62e on the outer periphery of the inner cylinder 62 so as to complete the leak oil passage from the oil passage 70 to the opened upper valve port 84, thereby draining oil from the oil passage 70 into the oil sump in the transaxle housing 33 above the leak valve 68.

If the movement of piston 64 is slowed or stopped and oil in the piston chamber 62c is allowed to flow through the orifice 64a, the inner cylinder 62 shifted in the upper or lower valve opening position gradually slides in the outer cylinder 58 by biasing force of the spring 59 so as to return to the valve closing position while allowing the piston 64 to remain in its shifted position (see S23 in FIG. 10 and S33 in FIG. 11).

Explanation will now be given of actuation of the leak valve 68 when suddenly depressing and releasing either the pedal 26a of accelerator 26 for forward traveling or pedal 26b of accelerator 26 for backward traveling in accordance with FIGS. 5 and 9 to 11.

When the HST 25 is set for forward traveling of the vehicle, the oil passage 70 is higher-pressured, and the oil passage 71 is depressed. As shown in FIGS. 5, 9 and 10, when the leak valve 68 is in a closed neutral state (S21) and the front pedal 26a of accelerator 26 is depressed suddenly for forward traveling, the speed change lever 30 and the rotary cam 50 are suddenly rotated together centered on the operation shaft 31 to a forward traveling direction F, thereby suddenly pulling up the piston rod 55 and piston 64.

The piston 64, which is going to move rapidly upward in the piston chamber 62c relative to the inner cylinder 62, is pressured downward by the oil within the piston chamber 62c above the piston 64, thereby pressing down the reed valve 63 and closing the orifice 64a. Accordingly, the oil in the upper area of piston chamber 62c above the piston 64 has no escape path, thereby resisting the upward slide of piston 64. Therefore, the upward moving piston 64 applies upward pressure to the inner cylinder 62 through the oil in the chamber 62c above the piston 64 so as to upwardly move the inner cylinder 62 together with the piston 64.

Thus, the leak valve 68 is turned into the downwardly open state (S22) where the inner cylinder 62 is shifted in the upper valve opening position so as to open the lower valve port 85 to the oil sump for leaking oil from the oil passage 70, so that the pressure of oil in the oil passage 70, when the HST 25 is set for forward traveling of the vehicle, is increased while being prevented from suddenly changing, that is, output rotation of the hydraulic motor 36 is gradually accelerated.

When the upward movement of the piston 64 is stopped, the reed valve 63 is returned by its elasticity so as to open the orifice 64a. Accordingly, the downward biasing force of spring 59 becomes larger than the oil pressure in the piston chamber 62c for preventing the piston 64 from sliding relative to the inner cylinder 62, and the inner cylinder 62 is slid down to the valve closing position by the biasing force while the piston 64 remains. Consequently, the leak valve 68 is turned into a closed neutral state when the HST 25 is set for forward traveling of the vehicle (S23).

Then, if the depressed front pedal 26a of accelerator 26 is released suddenly, the speed change lever 30 and rotary arm 50 located in the forward traveling rotation range are suddenly rotated to a backward traveling rotational direction R by biasing force of the biasing spring 53 to return to their neutral position so as to bring the HST 25 into the neutral state. Simultaneously, the rotating rotary arm 50 suddenly pushes down the piston 64 and piston rod 55 shifted higher than their neutral position so as to return them to their neutral position.

The piston 64, which is going to slide down in the piston chamber 62c relative to the inner cylinder 62, creates upward pressure in the oil thereabove so as to open the reed valve 63. However, the opening area of orifice 64a while opening the reed valve 63 is too small to pass oil therethrough for allowing the sudden downward movement of piston 64 relative to the inner cylinder 62. Thus, the inner cylinder 62 is slid downward together with the piston 64 in the outer cylinder 58. Accordingly, the leak valve 68 is put into the upwardly open state (S24) where the inner cylinder 62 is shifted in the lower valve opening position so as to open the upper valve port 84 for leaking oil from the oil passage 70 to the oil sump in the transaxle housing 33 above the leak valve 68.

Therefore, the pressure in the oil passage 70, which is higher-pressured when the HST 25 is set for forward traveling of the vehicle, is prevented from suddenly decreasing, and the output rotation of the hydraulic motor 36 is gradually decelerated.

When the piston 64 reaches its neutral position in the leak valve 68 from the upwardly open state (S24), the inner cylinder 62 shifted in the lower valve opening position is going to slide upward by biasing force of the spring 59, and the reed valve 63 is opened by pressure from the orifice 64a. Therefore, the inner cylinder 62 is moved upward and returned to the valve closing position while the piston 64 is kept in its neutral position. Accordingly, the leak valve 68 is returned to the neutral state (S21).

Actuation of the leak valve 68 when the HST 25 is set for backward traveling of the vehicle will now be explained. When the HST 25 is set for backward traveling of the vehicle, the oil passage 70 is depressed and the oil passage 71 is higher-pressured.

As shown in FIGS. 5, 9 and 11, when the leak valve 68 is in the closed neutral state (S31) and the rear pedal 26b of accelerator 26 is suddenly depressed for backward traveling, the speed change lever 30 and rotary arm 50 are suddenly rotated integrally centered on the operation shaft 31 to the backward traveling direction R so as to suddenly push down the piston rod 55 and piston 64.

When the piston 64 is going to move downward, the reed valve 63 is opened. If the open area of orifice 64a is sufficiently small, the piston 64 and inner cylinder 62 are slid substantially integrally downward in the outer cylinder 58, whereby the leak valve 68 is turned into the upwardly open state (S32) where the inner cylinder 62 is shifted in the lower valve opening position so as to open the oil passage 70 to the oil sump in the transaxle housing 33 through the upper valve port 84. The oil passage 70 is depressed when the HST 25 is set for backward traveling. However, if the hydraulic pressure in the oil passage 70 is higher than the pressure in the oil sump, oil may be drained from the HST closed circuit to the oil sump so as to moderate the change of output rotation of HST 25.

When the downward movement of piston 64 with the inner cylinder 62 is slowed or stopped, the inner cylinder 62 is going to slide upward by biasing force of the spring 59, and the reed valve 63 is opened so as to allow oil to flow through the orifice 64a. Therefore, the inner cylinder 62 is slid upward in the outer cylinder 58 to the valve closing position while the piston 64 is kept in the downwardly shifted position. Accordingly, the leak valve 68 is turned into a closed neutral state while the HST 25 is set for backward traveling of the vehicle (S33).

On the other hand, if the open area of orifice 64a is sufficiently large, the oil passes rapidly through orifice 64a following the sudden downward movement of piston 64, whereby the inner cylinder 62 remains in place while the piston 64 is suddenly moved downward. That is, the leak valve 68 is turned into the closed neutral state when the HST 25 is set for backward traveling of the vehicle (S33). Namely, whether the inner cylinder 62 is moved together with the suddenly lowered piston 64 or not is dependent on the open area of the orifice 64a.

When the leak valve 68, while setting the HST 25 for backward traveling of the vehicle, is in the closed neutral state (S33) and the depressed pedal 26b of accelerator 26 is suddenly released from depression, the speed change lever 30 and rotary arm 50 are suddenly rotated together centered on the operation shaft 31 to the forward traveling rotational direction F so as to suddenly pull up the piston rod 55 with piston 64.

The upwardly moving piston 64 is downwardly pressured by the oil above it within the chamber 62c so that the reed valve 63 thereon is bent downward and closes the orifice 64a. Accordingly, oil above and below the piston 64 in the inner cylinder 62 cannot move, and the piston 64 and inner cylinder 62 are slid integrally upward in the outer cylinder 58, whereby the leak valve 68 is turned into the downwardly open state (S34) where the inner cylinder 62 is shifted in the upper valve opening position so as to complete the leak oil passage from the oil passage 70 to the oil sump in the housing through the lower valve port 85. When the HST 25 is set for backward traveling of the vehicle, the oil passage 70 is depressed but at a pressure higher than the oil sump in the transaxle housing 33, thereby draining oil from the HST closed circuit to the oil sump, whereby output rotation of the hydraulic motor 36 is gradually accelerated.

When the piston 64 is returned to its neutral position and stopped, the pressure of the oil above the reed valve 63 is decreased and the reed valve 63 is returned to the original state so as to open the orifice 64a, whereby oil in the inner cylinder 62 is allowed to move vertically through the piston 64. Therefore, the inner cylinder 62 is slid downward in the outer cylinder 58 to the valve closing position while the piston 64 is kept in its raised position. Accordingly, the leak valve 68 is returned to the closed neutral state (S31).

Alternatively, if the pedal 26a or 26b of accelerator 26 is gradually depressed or released, the reed valve 63 is not bent, so that oil above the piston 64 can move through the gap between the reed valve 63 and the upper surface of the piston 64 and through the orifice 64a to the area below the piston 64, and the oil below the piston 64 can move through the orifice 64a and through the gap formed between the reed valve 63 and the upper surface of the piston 64 to the area above the piston 64.

Accordingly, during gradual operation of accelerator 26 for forward traveling, as shown in FIG. 10, the leak valve 68 is shifted from the closed neutral state (S21) to the closed state for forward traveling (S23) without passing the downwardly open state (S22). that is, the leak valve 68 is kept closed so that pressure oil does not flow out from the oil passage 70. During gradual operation of the accelerator 26 for backward traveling, as shown in FIG. 11, the leak valve 68 is shifted from the closed neutral state (S31) to the closed state for backward traveling (S33) without passing the upwardly open state (S32), that is, the leak valve 68 is kept closed so that pressure oil does not flow out from the oil passage 70.

As mentioned above, when suddenly operating the accelerator 26, the leak valve 68 is opened, wherein movement of the inner cylinder 62 completes the leak oil passage from the oil passage 70, which is higher-pressured when the HST 25 is engaged for forward traveling and depressed when the HST 25 is engaged for backward traveling, to the oil sump, thereby draining some of oil from the HST closed circuit to the oil sump through the leak oil passage. When gradually operating the accelerator 26, the leak valve 68 is kept closed, wherein the inner cylinder 62 cuts off the leak oil passage.

When the speed change lever 30 and rotary arm 50 are suddenly operated to move the piston 64, the reed valve 63 closes the orifice 64a or, alternatively, the opening of orifice 64 is so small as to resist oil flow between the areas above and below the piston 64 in the inner cylinder 62, whereby the inner cylinder 62 is slid together with the piston 64 upward or downward in the outer cylinder 58 so as to change its position relative to the outer cylinder 58, thereby opening the leak valve 68 so as to connect the HST closed circuit to the oil sump through the leak oil passage.

By leaking oil from the closed circuit of the HST 25, pressure in the closed circuit is prevented from suddenly changing, and output rotation of the hydraulic motor 36 is gradually changed. Thus, even if the accelerator 26 is suddenly operated, the vehicle is prevented from jerky movement, that is, lifting of the front portion of the vehicle is limited.

Moreover, even if the leak valve 68 is opened so as to leak oil from the oil passage 70, the leak valve 68 is automatically closed afterward so as to make output of the HST 25 fully usable because only the inner cylinder 62 is returned to the valve closing position while piston 64 remains shifted. The reason why only the inner cylinder 62 returns to the initial valve closing position is that oil in the inner cylinder 62 is allowed to gradually flow between the areas above and below the piston 64 through the orifice 64a, and that the inner cylinder 62 is biased to return to the valve closing position by the spring 59. In addition, when the movement of piston 64 is slowed or stopped, pressure applied onto the reed valve 63 closing the orifice 64a is reduced so as to return the reed valve 63 to its original position and open the orifice 64a.

Next, a second embodiment of the leak valve 68, as shown in FIGS. 12 to 16, will be described.

Figure 12:
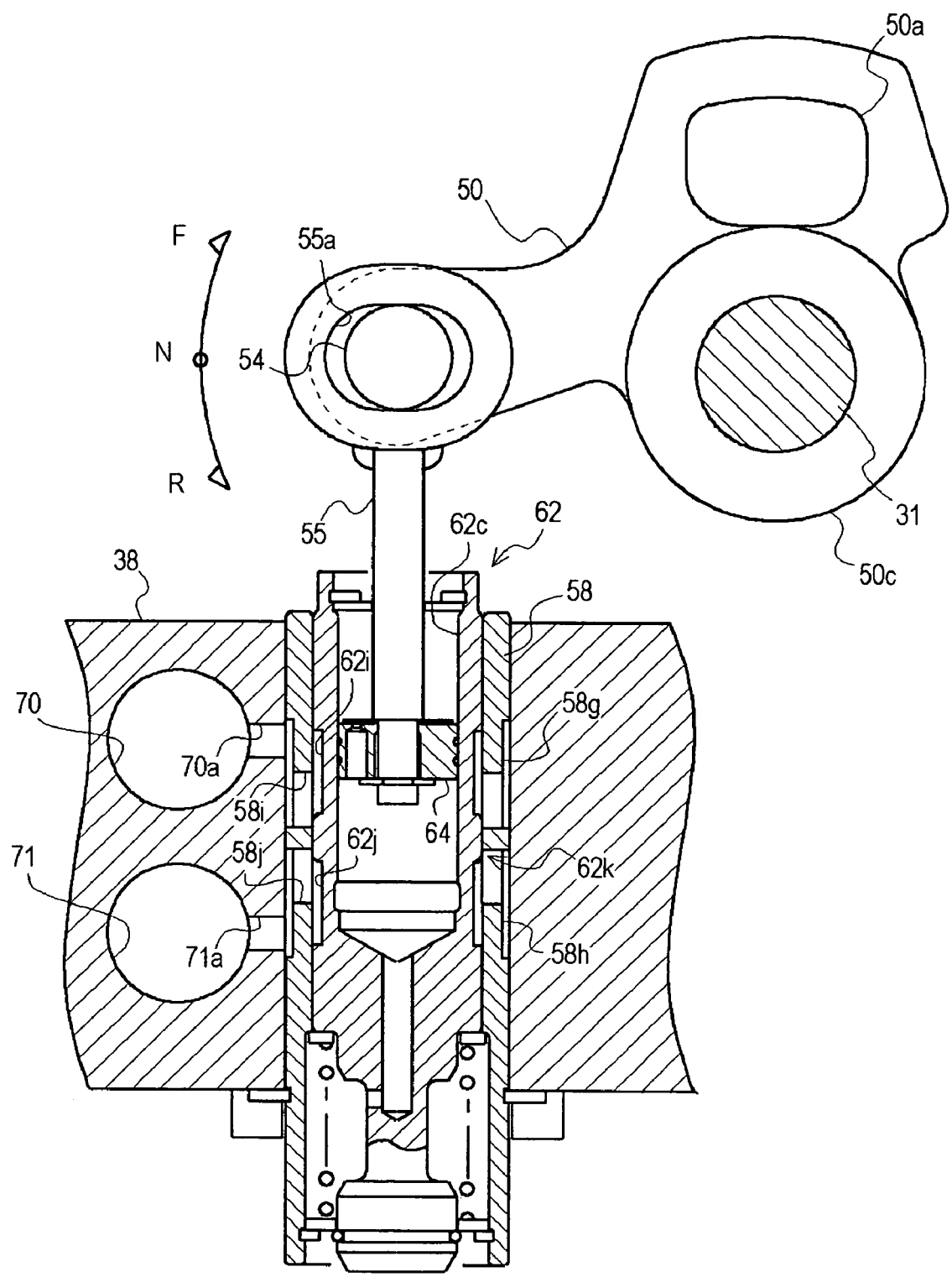
FIG. 12 is a cross-sectional view of a leak valve according to a second embodiment of the present invention, in a neutral state when a vehicle is stationary.

As shown in FIG. 12, upper and lower annular grooves 62i and 62j are formed on the outer periphery of the inner cylinder 62 instead of the grooves 62e and 62h of the above-mentioned embodiment shown in FIG. 5. Upper and lower annular grooves 58g and 58h are formed on the outer periphery of the outer cylinder 58 instead of the groove 58a of the embodiment shown in FIG. 5.

Center section 38 is formed with the upper oil passage 70 to be higher-pressured when the HST 25 is set for forward traveling of the vehicle and the lower oil passage 71 to be higher-pressured when the HST 25 is set for backward traveling of the vehicle. The center section 38 also houses the connection port 70a extended from the oil passage 70 so as to be constantly open to the upper groove 58g, and another connection oil hole 71a extended from the lower oil passage 71 so as to be constantly open to the lower groove 58h.

Within the outer cylinder 58, evenly leveled upper connection ports 58i are extended inward from the upper grooves 58g, and evenly leveled lower connection ports 58j from the lower groove 58h. The connection ports 58i and 58j are open on the inner peripheral surface of the outer cylinder 58.

Other parts designated by the same reference numerals with those of the leak valve 68 according to the first embodiment shown in FIGS. 5 and 9 to 11 are also used in this embodiment.

Figure 14:
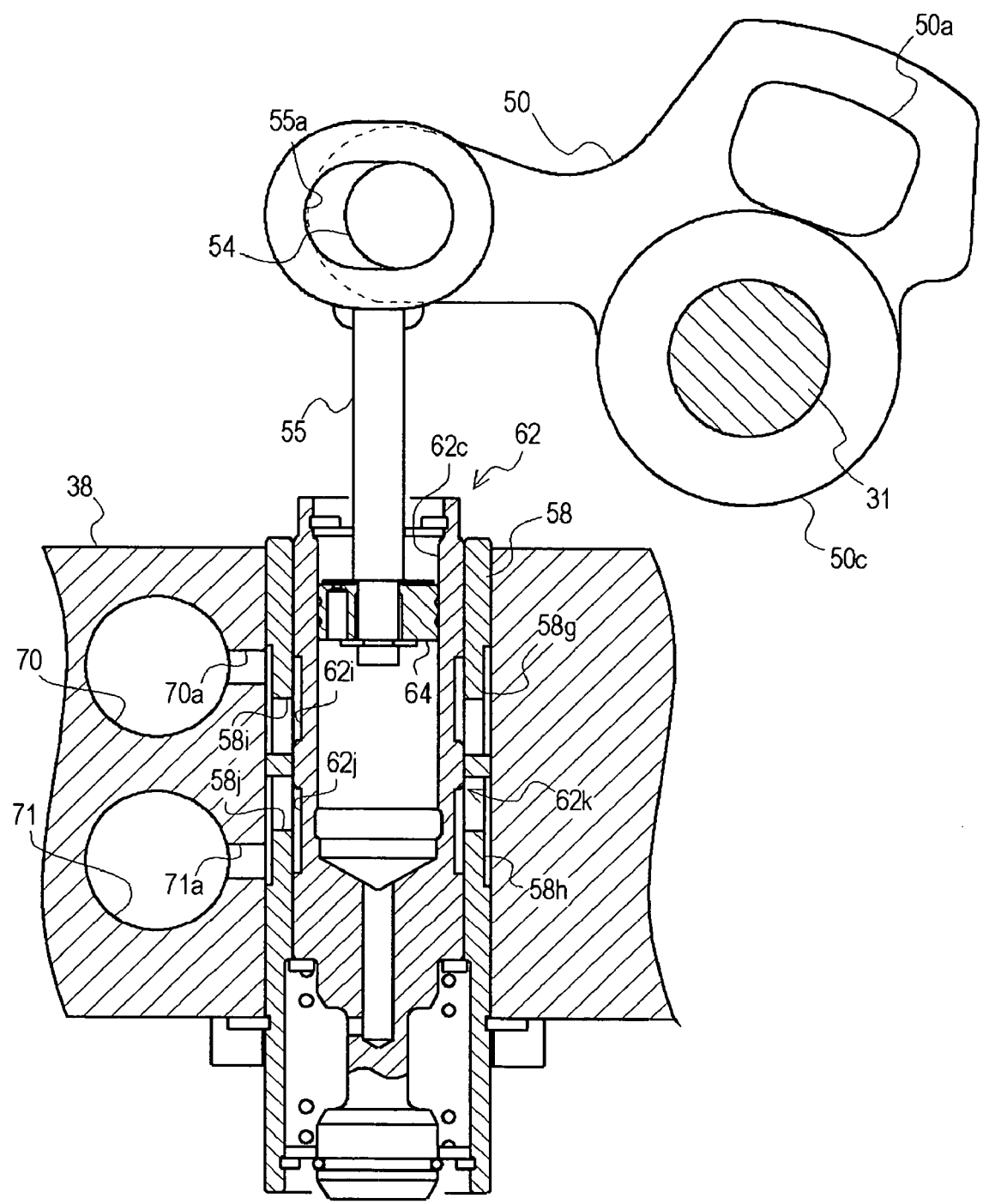
FIG. 14 is a cross-sectional view of the leak valve of the second embodiment at the time of gradual upward movement of the piston rod for forward acceleration.

As shown in FIGS. 12 and 14, when the inner cylinder 62 is located in the valve closing position in the outer cylinder 58, the upper groove 62i is connected to the upper connection ports 58i and separated from the lower connection ports 58j, and the lower groove 62j is connected to the lower connection ports 58j and separated from the upper connection ports 58i, so that the inner cylinder 62 separates the upper and lower connection ports 58i and 58j from each other. As a result, leak oil passage between the oil passages 70 and 71 is cut off. Namely, the leak valve 68 is closed.

Figure 13:
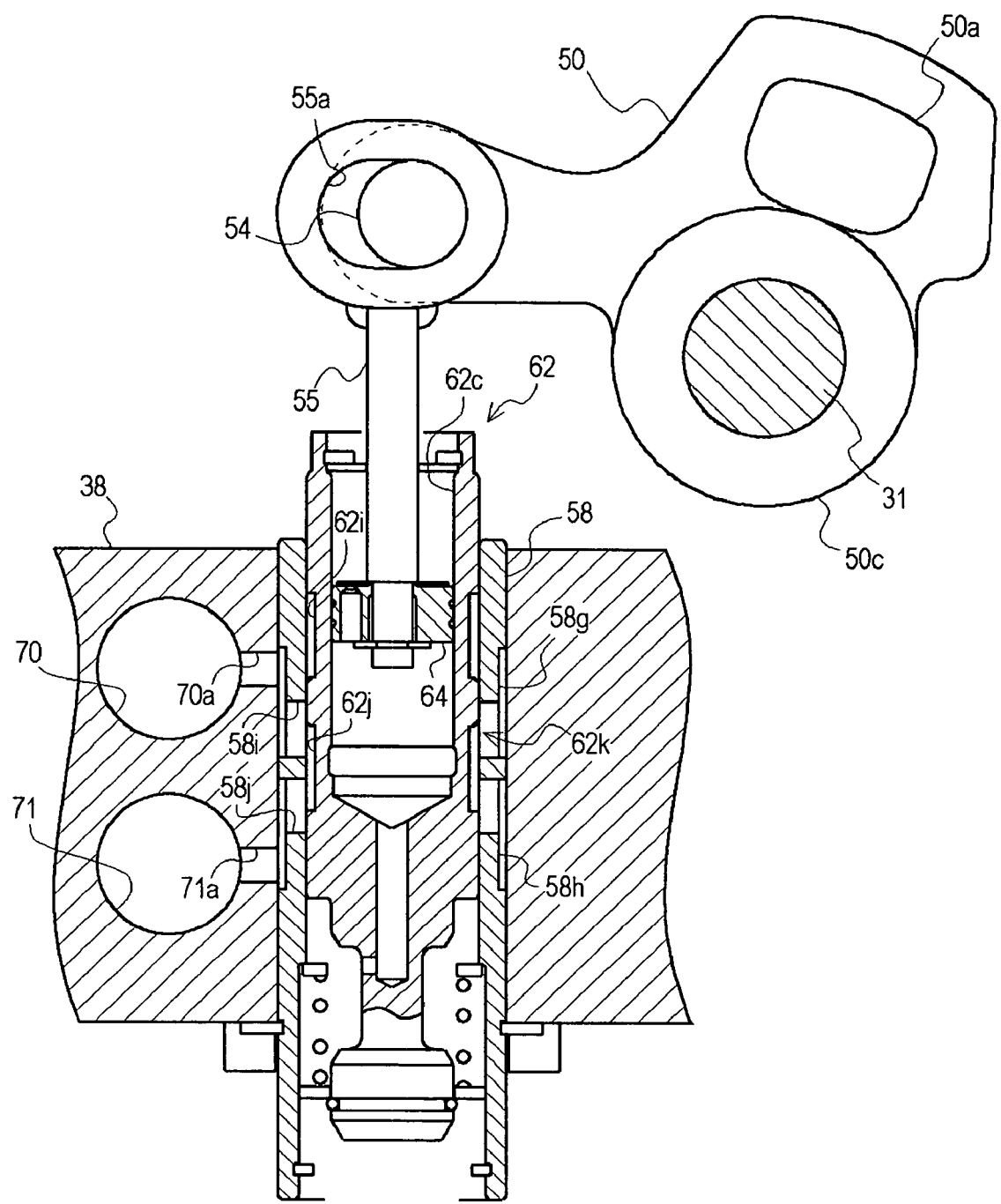
FIG. 13 is a cross-sectional view of the leak valve of the second embodiment at the time of sudden upward movement of a piston rod for forward acceleration.

If the front pedal 26a of accelerator 26 is suddenly depressed for forward traveling, the piston rod 55 is suddenly moved upward and the inner cylinder 62 is slid upward together with the piston 64 from the valve closing position in the outer cylinder 58 for the same reason for upward movement of the inner cylinder 62 in the leak valve 68 of the first embodiment shown in FIGS. 5, 9 to 11. Inner cylinder 62 reaches the upper valve opening position so as to communicate the lower groove 62j with both of the upper and lower connection ports 58i and 58j, as shown in FIG. 13, thereby completing a bypass (leak) oil passage for leaking oil from the higher-pressured upper oil passage 70 to the depressed lower oil passage 71 through the connection port 70a, the upper groove 58g, the upper connection ports 58i, the lower groove 62j, the lower connection ports 58j, the lower groove 58h and the lower connection port 71a. Namely, the leak valve 68 is opened.

When the suddenly upward movement of piston 64 is softened or stopped, the upwardly shifted inner cylinder 62 returns from the upper valve opening position to the valve closing position as shown in FIG. 14, while the piston 64 is maintained in the upwardly shifted position, by the same reason for return of the inner cylinder 62 in the leak valve 68 of the first embodiment. The inner cylinder 62 reaching the valve closing position separates the upper and lower connection ports 58i and 58j from each other, i.e., cuts off the bypass oil passage, thereby closing the leak valve 68.

Alternatively, if the front pedal 26a is gradually depressed and the piston rod 55 is gradually moved upward, the inner cylinder 62 remains in the valve closing position and only the piston 64 is slid upward, whereby the leak valve 68 is kept closed. This state of leak valve 68 is illustrated by FIG. 14.

Figure 15:
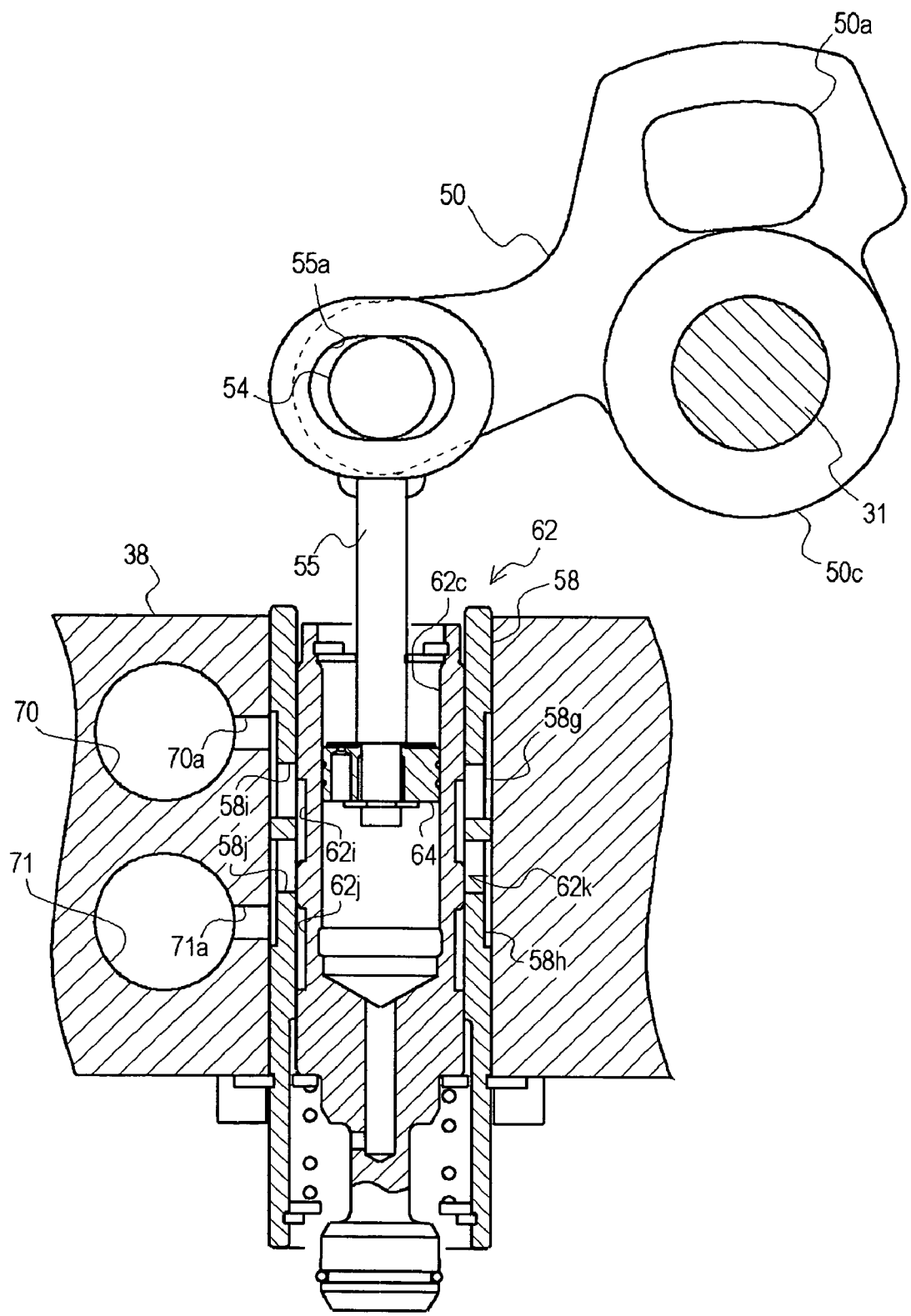
FIG. 15 is a cross-sectional view of the leak valve of the second embodiment at the time of sudden downward movement of the piston rod for backward acceleration.

If the rear pedal 26b of accelerator 26 is suddenly depressed for backward traveling, the piston rod 55 is suddenly moved downward, and the inner cylinder 62 is slid downward together with the piston 64 from the valve closing position in the outer cylinder 58, and reaches the lower valve opening position as shown in FIG. 15 so as to communicate the upper groove 62i with both of the upper and lower connection ports 58i and 58j, thereby completing a bypass (leak) oil passage for leaking oil from the higher-pressured lower oil passage 71 to the depressed upper oil passage 70 through the lower connection port 71a, the lower groove 58h, the lower connection ports 58j, the upper groove 62i, the upper connection ports 58i, the upper groove 58g and the upper connection port 70a. Namely, the leak valve 68 is opened.

When the sudden downward movement of the piston rod 55 is slowed or stopped, the inner cylinder 62, which was caused to move together with the piston 64 by the sudden downward movement of piston rod 55, is able to return to the valve closing position to close the leak valve 68. Also, if the rear pedal 26b of accelerator 26 is gradually depressed so as to gradually move the piston rod 55 downward, the inner cylinder 62 is kept in the valve closing position regardless of the movement of the piston 64, whereby the leak valve is kept closed.

In this way, the leak valve 68 of the second embodiment leaks pressure oil from the higher-pressured oil passage in the HST closed circuit to the depressed oil passage in the HST closed circuit during a sudden speed change for either forward traveling or backward traveling, thereby preventing the HST 25 from suddenly changing output rotational speed.

Furthermore, in comparison with the first embodiment, the leak valve 68 according to the second embodiment bypasses oil within the closed circuit of the HST 25 between the hydraulic pump 37 and motor 36, thereby inhibiting cavitation and reducing noise.

Furthermore, in this embodiment, an annularly projecting land portion 62k is provided between the upper and lower grooves 62i and 62j on the outer periphery of the inner cylinder 62. Upper and lower ends of the land portion 62k are slanted toward the grooves 62i and 62j as shown in FIGS. 12 to 15. That slanted portion allows the flow and pressure of the oil change gradually at the time of connection or disconnection of either groove 62i or 62j to the connection ports 58i and 58j by the vertical movement of the inner cylinder 62. Accordingly, shock at the time of sudden speed change operation is reduced.

Figure 16:
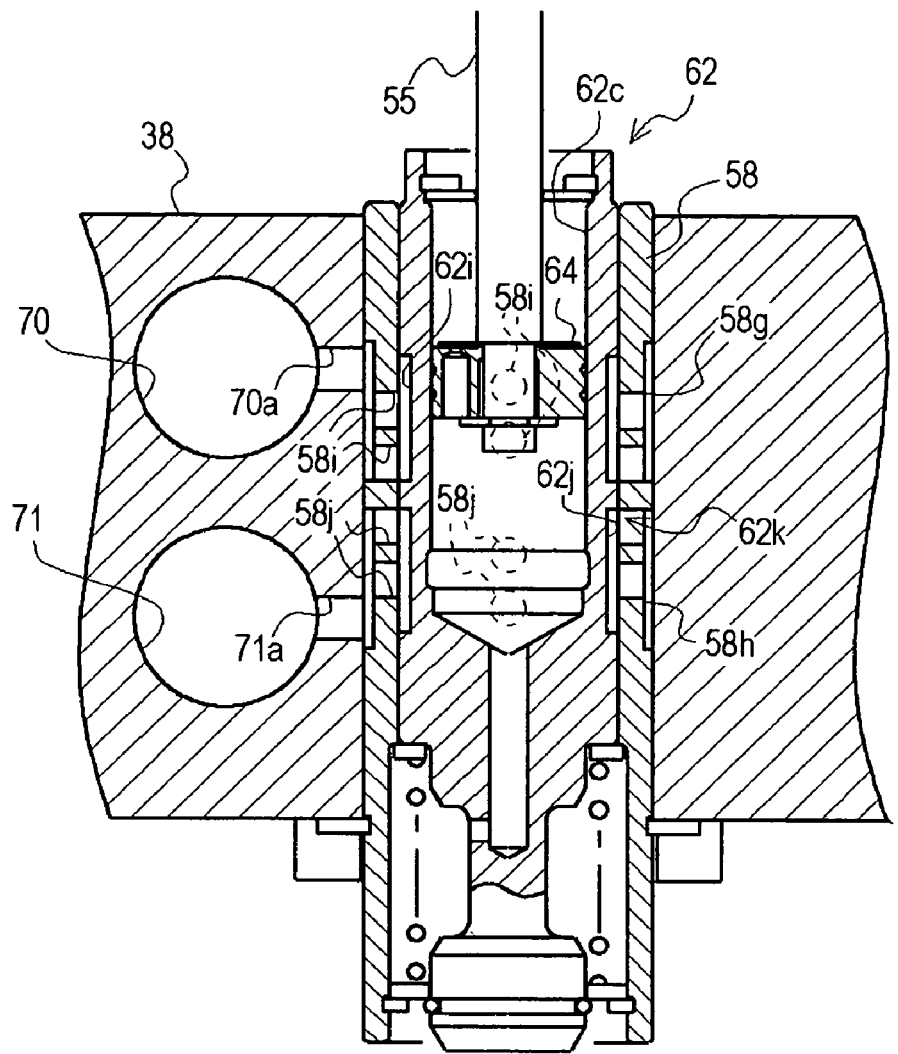
Figure 16:
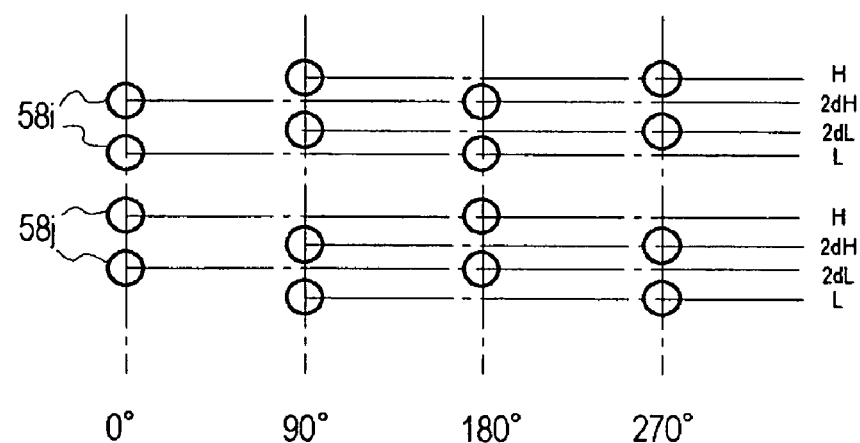

Next, explanation will be given of a third embodiment of the leak valve 68 shown in FIG. 16. FIG. 16 shows a modified leak valve 68 of the second embodiment. The leak valve 68 of this embodiment also leaks oil from the higher-pressured oil passage in the HST closed circuit to the depressed oil passage in the HST closed circuit when speed is suddenly changed.

In the side wall of outer cylinder 58, as shown in FIG. 16(a) and (b), four pairs of upper and lower connection ports 58i are formed at regular intervals (of 90 degrees) circumferentially around outer cylinder 58, and extended radially inward from the upper annular groove 58g, which is constantly open to the connection port 70a extended from the upper oil passage 70 which is higher-pressured when the HST 25 is set for forward traveling of the vehicle. Similarly, four pairs of upper and lower connection ports 58j are formed at regular intervals (of 90 degrees) circumferentially around outer cylinder 58, and extended radially inward from the lower annular groove 58h, which is constantly open to the connection port 71a extended from the lower oil passage 71 which is higher-pressured when the HST 25 is set for backward traveling of the vehicle. Each pair of upper and lower connection ports 58i and each pair of the upper and lower connection ports 58j are aligned in a vertical line. Thus, the outer cylinder 58 is formed with four sets of four vertically aligned connection ports 58i and 58j at regular intervals of 90 degrees Between the two alternate sets that are 180 degrees apart on the outer cylinder 58 (i.e., between the two opposite sets with respect to the vertical axis of leak valve 68), the four vertically aligned connection ports 58i and 58j of one set are evenly leveled horizontally with the four vertically aligned connection ports 58i and 58j of the other set. Between the two neighboring sets that are 90 degrees apart on the outer cylinder 58, the levels of one set of four vertically aligned connection ports 58i and 58j are not horizontally aligned with the other set of four vertically aligned connection ports 58i and 58j as explained in greater detail below.

As shown in FIG. 16b, the four pairs of vertically aligned connection ports 58i (or 58j) consist of two opposite lowest connection ports 58i (or 58j) shifted 90° apart from two opposite second-lowest connection ports 58i (or 58j), and two opposite second-highest connection ports 58i (or 58j) shifted 90° apart from two opposite highest connection ports 58i (or 58j). Furthermore, the two second-highest connection ports 58i (or 58j) are vertically aligned with the two lowest connection ports 58i (or 58j) and the highest connection ports 58i (or 58j) are vertically aligned with the second-lowest connection ports 58i (or 58j).

The oil path created in the third embodiment is described below with respect to a sudden upward movement of the inner cylinder 62 together with the piston 64. At first, the lower groove 62j is connected to the lowest connection ports 58i and becomes separated from the lowest connection ports 58j, wherein the groove 62j communicates with the higher-pressured upper oil passage 70 through only the lowest two connection ports 58i, and with the depressed oil passage 71 through six connection ports 58j (the highest, second-highest, and second-lowest connection ports 58j), so that oil leakage from the higher-pressured oil passage 70 is restricted.

As the inner cylinder 62 and piston 64 are moved further upward, the groove 62j is additionally connected to the second-lowest connection ports 58i and becomes separated from the second-lowest connection ports 58j, wherein the groove 62j communicates with the higher-pressured oil passage 70 through four connection ports 58i (the lowest and second-lowest connection ports 58i), and with the depressed oil passage 71 through four connection ports 58j (the highest and second-highest connection ports 58*j*), so that oil leakage form the higher-pressured oil passage 70 to the depressed oil passage 71 is increased.

With still further upward movement of inner cylinder 62 and piston 64, the groove 62*j* is additionally connected to the second-highest connection ports 58*i* and becomes separated from the second-highest connection ports 58*j*. At that point, the groove 62*j* communicates with the higher-pressured oil passage 70 through six connection ports 58*i* (the lowest, second-lowest, and second-highest connection ports 58*i*), and with the depressed oil passage 71 through two connection ports 58*j* (the highest connection ports 58*j*), so that oil introduced into the depressed oil passage 71 is again restricted.

Finally, when the inner cylinder 62 reaches its upper limit position, the groove 62*j* is connected to all of the connection ports 58*i* and separated from all of the connection ports 58*j*, thereby stopping oil leakage from the higher-pressured oil passage 70 to the depressed oil passage 71.

As mentioned above, the open area between the oil passages 70 and 71 is gradually increased and subsequently decreased during the upward movement of inner cylinder 62, thereby improving stability of pressure in the closed circuit when leaking oil from the higher-pressured oil passage 70 to the depressed oil passage 71. When the inner cylinder 62 is suddenly moved downward together with the piston 64 a similar behavior results but in that case, upper groove 62*i* progressively becomes connected to more of the connection ports 58*j* and fewer of the connection ports 58*i*.

It is further understood by those skilled in the art that the foregoing description is a preferred embodiment of the disclosed apparatus and that various changes and modifications may be made in the invention without departing from the spirit and scope thereof.

What is claimed is:

1. A transaxle comprising:
   a common housing filled with fluid so as to serve as a fluid sump;
   a hydraulic pump disposed in the housing and driven by a prime mover, the hydraulic pump including a movable swash plate, wherein the movable swash plate is operated by an external operation force so as to change the fluid delivery amount and direction of the hydraulic pump;
   a hydraulic motor disposed in the housing and driven by fluid delivered from the hydraulic pump;
   an axle disposed in the housing and driven by output force of the hydraulic motor;
   a center section on which the hydraulic pump and motor are mounted;
   a closed hydraulic circuit formed in the center section so as to hydraulically connect the hydraulic pump and motor to each other; and
   a valve disposed within the center section, wherein a valve port of the valve to be selectively opened or closed is disposed within the center section, and wherein the valve mechanically interlocks with the movable swash plate so as to release fluid from a hydraulically high-pressurized portion of the closed hydraulic circuit to a hydraulically depressed portion of the transaxle through the opened valve port in correspondence to a condition of fluid flowing in the hydraulic circuit.

2. The transaxle according to claim 1, further comprising:
   detection means detecting movement speed of the movable swash plate so as to recognize the condition of fluid flowing in the hydraulic circuit, wherein the valve is operatively connected to the movable swash plate and the detection means.

3. The transaxle according to claim 2, wherein the valve is disposed within the center section so as to be slidable in a direction perpendicular to a rotation axis of the movable swash plate, thereby releasing fluid from the hydraulically high-pressurized portion of the closed hydraulic circuit to the hydraulically depressed portion of the transaxle.

4. The transaxle according to claim 1, wherein the fluid sump of the housing serves as the hydraulically depressed portion of the transaxle.

5. The transaxle according to claim 1, wherein the closed hydraulic circuit includes a pair of fluid passages interposed between the hydraulic pump and motor; wherein, when the fluid delivery amount and direction of the hydraulic pump is set for driving the axle, one of the fluid passages is hydraulically pressurized higher than the other, and wherein the hydraulically lower-pressurized fluid passage serves as the hydraulically depressed portion of the transaxle.

* * * * *